(12) United States Patent
Song et al.

(10) Patent No.: US 10,440,407 B2
(45) Date of Patent: Oct. 8, 2019

(54) ADAPTIVE CONTROL FOR IMMERSIVE EXPERIENCE DELIVERY

(71) Applicant: Google LLC, Mountain View, CA (US)

(72) Inventors: Alex Song, San Jose, CA (US); Derek Pang, San Jose, CA (US); Mike Ma, San Jose, CA (US); Nikhil Karnad, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 5 days.

(21) Appl. No.: 15/590,808

(22) Filed: May 9, 2017

(65) Prior Publication Data

US 2018/0332317 A1 Nov. 15, 2018

(51) Int. Cl.
| | |
|---|---|
| *H04N 21/234* | (2011.01) |
| *G02B 27/22* | (2018.01) |
| *H04N 13/117* | (2018.01) |
| *H04N 13/373* | (2018.01) |
| *H04N 13/38* | (2018.01) |

(Continued)

(52) U.S. Cl.
CPC ... *H04N 21/23418* (2013.01); *G02B 27/2228* (2013.01); *G06F 16/70* (2019.01); *H04N 13/117* (2018.05); *H04N 13/344* (2018.05); *H04N 13/366* (2018.05); *H04N 13/373* (2018.05); *H04N 13/38* (2018.05); *H04N 13/398* (2018.05); *H04N 21/21805* (2013.01); *H04N 21/23439* (2013.01);
(Continued)

(58) Field of Classification Search
CPC ........... H04N 21/23418; H04N 13/117; H04N 13/38; H04N 13/373; G02B 27/2228

USPC .................................. 345/619, 632, 633
See application file for complete search history.

(56) References Cited

U.S. PATENT DOCUMENTS

| | | | |
|---|---|---|---|
| 725,567 | A | 4/1903 | Ives |
| 4,383,170 | A | 5/1983 | Takagi et al. |

(Continued)

FOREIGN PATENT DOCUMENTS

| | | |
|---|---|---|
| CN | 101226292 | 7/2008 |
| CN | 101309359 | 11/2008 |

(Continued)

OTHER PUBLICATIONS

Georgiev, T., et al., "Suppersolution with Plenoptic 2.0 Cameras," Optical Society of America 2009; pp. 1-3.

(Continued)

*Primary Examiner* — Sarah Lhymn

(57) ABSTRACT

A combined video of a scene may be generated for applications such as virtual reality or augmented reality. In one method, a data store may store video data with a first portion having a first importance metric, and a second portion having a second importance metric, denoting that viewing of the first portion is more likely and/or preferential to viewing of the second portion. The subset may be retrieved and used to generate viewpoint video from a virtual viewpoint corresponding to a viewer's viewpoint. The viewpoint video may be displayed on a display device. One of storing the video data, retrieving the subset, and using the subset to generate the viewpoint video may include, based on the difference between the first and second importance metrics, expediting and/or enhancing performance of the step for the first portion, relative to the second portion.

36 Claims, 12 Drawing Sheets

(51) Int. Cl.
*G06F 16/70* (2019.01)
*H04N 13/344* (2018.01)
*H04N 13/366* (2018.01)
*H04N 13/398* (2018.01)
*H04N 21/218* (2011.01)
*H04N 21/2343* (2011.01)
*H04N 21/845* (2011.01)

(52) U.S. Cl.
CPC ............ *H04N 21/234345* (2013.01); *H04N 21/234363* (2013.01); *H04N 21/234381* (2013.01); *H04N 21/8456* (2013.01)

(56) References Cited

U.S. PATENT DOCUMENTS

| | | | |
|---|---|---|---|
| 4,661,986 A | 4/1987 | Adelson | |
| 4,694,185 A | 9/1987 | Weiss | |
| 4,920,419 A | 4/1990 | Easterly | |
| 5,076,687 A | 12/1991 | Adelson | |
| 5,077,810 A | 12/1991 | D'Luna | |
| 5,251,019 A | 10/1993 | Moorman et al. | |
| 5,282,045 A | 1/1994 | Mimura et al. | |
| 5,499,069 A | 3/1996 | Griffith | |
| 5,572,034 A | 11/1996 | Karellas | |
| 5,610,390 A | 3/1997 | Miyano | |
| 5,729,471 A * | 3/1998 | Jain ................. | H04N 13/139 725/131 |
| 5,748,371 A | 5/1998 | Cathey, Jr. et al. | |
| 5,757,423 A | 5/1998 | Tanaka et al. | |
| 5,818,525 A | 10/1998 | Elabd | |
| 5,835,267 A | 11/1998 | Mason et al. | |
| 5,907,619 A | 5/1999 | Davis | |
| 5,949,433 A | 9/1999 | Klotz | |
| 5,974,215 A | 10/1999 | Bilbro et al. | |
| 6,005,936 A | 12/1999 | Shimizu et al. | |
| 6,021,241 A | 2/2000 | Bilbro et al. | |
| 6,023,523 A | 2/2000 | Cohen et al. | |
| 6,028,606 A | 2/2000 | Kolb et al. | |
| 6,034,690 A | 3/2000 | Gallery et al. | |
| 6,061,083 A | 5/2000 | Aritake et al. | |
| 6,061,400 A | 5/2000 | Pearlstein et al. | |
| 6,069,565 A | 5/2000 | Stern et al. | |
| 6,075,889 A | 6/2000 | Hamilton, Jr. et al. | |
| 6,084,979 A * | 7/2000 | Kanade ............... | H04N 13/243 382/154 |
| 6,091,860 A | 7/2000 | Dimitri | |
| 6,097,394 A | 8/2000 | Levoy et al. | |
| 6,115,556 A | 9/2000 | Reddington | |
| 6,137,100 A | 10/2000 | Fossum et al. | |
| 6,169,285 B1 | 1/2001 | Pertrillo et al. | |
| 6,201,899 B1 | 3/2001 | Bergen | |
| 6,221,687 B1 | 4/2001 | Abramovich | |
| 6,320,979 B1 | 11/2001 | Melen | |
| 6,424,351 B1 | 7/2002 | Bishop et al. | |
| 6,448,544 B1 | 9/2002 | Stanton et al. | |
| 6,466,207 B1 | 10/2002 | Gortler et al. | |
| 6,476,805 B1 | 11/2002 | Shum et al. | |
| 6,479,827 B1 | 11/2002 | Hamamoto et al. | |
| 6,483,535 B1 | 11/2002 | Tamburrino et al. | |
| 6,529,265 B1 | 3/2003 | Henningsen | |
| 6,577,342 B1 | 6/2003 | Webster | |
| 6,587,147 B1 | 7/2003 | Li | |
| 6,597,859 B1 | 7/2003 | Leinhardt et al. | |
| 6,606,099 B2 | 8/2003 | Yamada | |
| 6,658,168 B1 | 12/2003 | Kim | |
| 6,674,430 B1 | 1/2004 | Kaufman et al. | |
| 6,680,976 B1 | 1/2004 | Chen et al. | |
| 6,687,419 B1 | 2/2004 | Atkin | |
| 6,697,062 B1 | 2/2004 | Cabral | |
| 6,768,980 B1 | 7/2004 | Meyer et al. | |
| 6,785,667 B2 | 8/2004 | Orbanes et al. | |
| 6,833,865 B1 | 12/2004 | Fuller et al. | |
| 6,842,297 B2 | 1/2005 | Dowski, Jr. et al. | |
| 6,900,841 B1 | 5/2005 | Mihara | |
| 6,924,841 B2 | 8/2005 | Jones | |
| 6,927,922 B2 | 8/2005 | George et al. | |
| 7,015,954 B1 | 3/2006 | Foote et al. | |
| 7,025,515 B2 | 4/2006 | Woods | |
| 7,034,866 B1 | 4/2006 | Colmenarez et al. | |
| 7,079,698 B2 | 7/2006 | Kobayashi | |
| 7,102,666 B2 | 9/2006 | Kanade et al. | |
| 7,164,807 B2 | 1/2007 | Morton | |
| 7,206,022 B2 | 4/2007 | Miller et al. | |
| 7,239,345 B1 | 7/2007 | Rogina | |
| 7,286,295 B1 | 10/2007 | Sweatt et al. | |
| 7,304,670 B1 | 12/2007 | Hussey et al. | |
| 7,329,856 B2 | 2/2008 | Ma et al. | |
| 7,336,430 B2 | 2/2008 | George | |
| 7,417,670 B1 | 8/2008 | Linzer et al. | |
| 7,469,381 B2 | 12/2008 | Ording | |
| 7,477,304 B2 | 1/2009 | Hu | |
| 7,587,109 B1 | 9/2009 | Reininger | |
| 7,620,309 B2 | 11/2009 | Georgiev | |
| 7,623,726 B1 | 11/2009 | Georgiev | |
| 7,633,513 B2 | 12/2009 | Kondo et al. | |
| 7,683,951 B2 | 3/2010 | Aotsuka | |
| 7,687,757 B1 | 3/2010 | Tseng et al. | |
| 7,723,662 B2 | 5/2010 | Levoy et al. | |
| 7,724,952 B2 | 5/2010 | Shum et al. | |
| 7,748,022 B1 | 6/2010 | Frazier | |
| 7,847,825 B2 | 12/2010 | Aoki et al. | |
| 7,936,377 B2 | 5/2011 | Friedhoff et al. | |
| 7,936,392 B2 | 5/2011 | Ng et al. | |
| 7,941,634 B2 | 5/2011 | Georgi | |
| 7,945,653 B2 | 5/2011 | Zuckerberg et al. | |
| 7,949,252 B1 | 5/2011 | Georgiev | |
| 7,982,776 B2 | 7/2011 | Dunki-Jacobs et al. | |
| 8,013,904 B2 | 9/2011 | Tan et al. | |
| 8,085,391 B2 | 12/2011 | Machida et al. | |
| 8,106,856 B2 | 1/2012 | Matas et al. | |
| 8,115,814 B2 | 2/2012 | Iwase et al. | |
| 8,155,456 B2 | 4/2012 | Babacan | |
| 8,155,478 B2 | 4/2012 | Vitsnudel et al. | |
| 8,189,089 B1 | 5/2012 | Georgiev et al. | |
| 8,228,417 B1 | 7/2012 | Georgiev et al. | |
| 8,248,515 B2 | 8/2012 | Ng et al. | |
| 8,259,198 B2 | 9/2012 | Cote et al. | |
| 8,264,546 B2 | 9/2012 | Witt | |
| 8,279,325 B2 | 10/2012 | Pitts et al. | |
| 8,289,440 B2 | 10/2012 | Knight et al. | |
| 8,290,358 B1 | 10/2012 | Georgiev | |
| 8,310,554 B2 | 11/2012 | Aggarwal et al. | |
| 8,315,476 B1 | 11/2012 | Georgiev et al. | |
| 8,345,144 B1 | 1/2013 | Georgiev et al. | |
| 8,400,533 B1 | 3/2013 | Szedo | |
| 8,400,555 B1 | 3/2013 | Georgiev et al. | |
| 8,427,548 B2 | 4/2013 | Lim et al. | |
| 8,442,397 B2 | 5/2013 | Kang et al. | |
| 8,446,516 B2 | 5/2013 | Pitts et al. | |
| 8,494,304 B2 | 7/2013 | Venable et al. | |
| 8,531,581 B2 | 9/2013 | Shroff | |
| 8,542,933 B2 | 9/2013 | Venkataraman et al. | |
| 8,559,705 B2 | 10/2013 | Ng | |
| 8,570,426 B2 | 10/2013 | Pitts et al. | |
| 8,577,216 B2 | 11/2013 | Li et al. | |
| 8,581,998 B2 | 11/2013 | Ohno | |
| 8,589,374 B2 | 11/2013 | Chaudhri | |
| 8,593,564 B2 | 11/2013 | Border et al. | |
| 8,605,199 B2 | 12/2013 | Imai | |
| 8,614,764 B2 | 12/2013 | Pitts et al. | |
| 8,619,082 B1 | 12/2013 | Ciurea et al. | |
| 8,629,930 B2 | 1/2014 | Brueckner et al. | |
| 8,665,440 B1 | 3/2014 | Kompaniets et al. | |
| 8,675,073 B2 | 3/2014 | Aagaard et al. | |
| 8,724,014 B2 | 5/2014 | Ng et al. | |
| 8,736,710 B2 | 5/2014 | Spielberg | |
| 8,736,751 B2 | 5/2014 | Yun | |
| 8,749,620 B1 | 6/2014 | Pitts et al. | |
| 8,750,509 B2 | 6/2014 | Renkis | |
| 8,754,829 B2 | 6/2014 | Lapstun | |
| 8,760,566 B2 | 6/2014 | Pitts et al. | |
| 8,768,102 B1 | 7/2014 | Ng et al. | |
| 8,797,321 B1 | 8/2014 | Bertolami et al. | |

(56) References Cited

U.S. PATENT DOCUMENTS

| | | | |
|---|---|---|---|
| 8,811,769 B1 | 8/2014 | Pitts et al. | |
| 8,831,377 B2 | 9/2014 | Pitts et al. | |
| 8,848,970 B2 * | 9/2014 | Aller | H04M 1/72522 382/100 |
| 8,860,856 B2 | 10/2014 | Wetsztein et al. | |
| 8,879,901 B2 | 11/2014 | Caldwell et al. | |
| 8,903,232 B1 | 12/2014 | Caldwell | |
| 8,908,058 B2 | 12/2014 | Akeley et al. | |
| 8,948,545 B2 | 2/2015 | Akeley et al. | |
| 8,953,882 B2 | 2/2015 | Lim et al. | |
| 8,971,625 B2 | 3/2015 | Pitts et al. | |
| 8,976,288 B2 | 3/2015 | Ng et al. | |
| 8,988,317 B1 | 3/2015 | Liang et al. | |
| 8,995,785 B2 | 3/2015 | Knight et al. | |
| 8,997,021 B2 | 3/2015 | Liang et al. | |
| 9,001,226 B1 | 4/2015 | Ng et al. | |
| 9,013,611 B1 | 4/2015 | Szedo | |
| 9,106,914 B2 | 8/2015 | Doser | |
| 9,172,853 B2 | 10/2015 | Pitts et al. | |
| 9,184,199 B2 | 11/2015 | Pitts et al. | |
| 9,201,142 B2 | 12/2015 | Antao | |
| 9,201,193 B1 | 12/2015 | Smith | |
| 9,210,391 B1 | 12/2015 | Mills | |
| 9,214,013 B2 | 12/2015 | Venkataraman et al. | |
| 9,262,067 B1 | 2/2016 | Bell et al. | |
| 9,294,662 B2 | 3/2016 | Vondran, Jr. et al. | |
| 9,300,932 B2 | 3/2016 | Knight et al. | |
| 9,305,375 B2 | 4/2016 | Akeley | |
| 9,305,956 B2 | 4/2016 | Pittes et al. | |
| 9,386,288 B2 | 7/2016 | Akeley et al. | |
| 9,392,153 B2 | 7/2016 | Myhre et al. | |
| 9,419,049 B2 | 8/2016 | Pitts et al. | |
| 9,467,607 B2 | 10/2016 | Ng et al. | |
| 9,497,380 B1 | 11/2016 | Jannard et al. | |
| 9,607,424 B2 | 3/2017 | Ng et al. | |
| 9,628,684 B2 | 4/2017 | Liang et al. | |
| 9,635,332 B2 | 4/2017 | Carroll et al. | |
| 9,639,945 B2 | 5/2017 | Oberheu et al. | |
| 9,647,150 B2 | 5/2017 | Blasco Claret | |
| 9,681,069 B2 | 6/2017 | El-Ghoroury et al. | |
| 9,774,800 B2 | 9/2017 | El-Ghoroury et al. | |
| 9,858,649 B2 | 1/2018 | Liang et al. | |
| 9,866,810 B2 | 1/2018 | Knight et al. | |
| 9,900,510 B1 | 2/2018 | Karafin et al. | |
| 9,979,909 B2 | 5/2018 | Kuang et al. | |
| 2001/0048968 A1 | 12/2001 | Cox et al. | |
| 2001/0053202 A1 | 12/2001 | Mazess et al. | |
| 2002/0001395 A1 | 1/2002 | Davis et al. | |
| 2002/0015048 A1 | 2/2002 | Mister | |
| 2002/0061131 A1 | 5/2002 | Sawhney | |
| 2002/0109783 A1 | 8/2002 | Hayashi et al. | |
| 2002/0159030 A1 | 10/2002 | Frey et al. | |
| 2002/0199106 A1 | 12/2002 | Hayashi | |
| 2003/0043270 A1 | 3/2003 | Rafey | |
| 2003/0081145 A1 | 5/2003 | Seaman et al. | |
| 2003/0103670 A1 | 6/2003 | Schoelkopf et al. | |
| 2003/0117511 A1 | 6/2003 | Belz et al. | |
| 2003/0123700 A1 | 7/2003 | Wakao | |
| 2003/0133018 A1 | 7/2003 | Ziemkowski | |
| 2003/0147252 A1 | 8/2003 | Fioravanti | |
| 2003/0156077 A1 | 8/2003 | Balogh | |
| 2003/0172131 A1 | 9/2003 | Ao | |
| 2004/0002179 A1 | 1/2004 | Barton et al. | |
| 2004/0012688 A1 | 1/2004 | Tinnerinno et al. | |
| 2004/0012689 A1 | 1/2004 | Tinnerinno et al. | |
| 2004/0101166 A1 | 5/2004 | Williams et al. | |
| 2004/0114176 A1 | 6/2004 | Bodin et al. | |
| 2004/0135780 A1 | 7/2004 | Nims | |
| 2004/0189686 A1 | 9/2004 | Tanguay et al. | |
| 2004/0212725 A1 | 10/2004 | Raskar | |
| 2004/0257360 A1 | 12/2004 | Sieckmann | |
| 2005/0031203 A1 | 2/2005 | Fukuda | |
| 2005/0049500 A1 | 3/2005 | Babu et al. | |
| 2005/0052543 A1 | 3/2005 | Li et al. | |
| 2005/0080602 A1 | 4/2005 | Snyder et al. | |
| 2005/0141881 A1 | 6/2005 | Taira et al. | |
| 2005/0162540 A1 | 7/2005 | Yata | |
| 2005/0212918 A1 | 9/2005 | Serra et al. | |
| 2005/0276441 A1 | 12/2005 | Debevec | |
| 2006/0023066 A1 | 2/2006 | Li et al. | |
| 2006/0050170 A1 | 3/2006 | Tanaka | |
| 2006/0056040 A1 | 3/2006 | Lan | |
| 2006/0056604 A1 | 3/2006 | Sylthe et al. | |
| 2006/0072175 A1 | 4/2006 | Oshino | |
| 2006/0078052 A1 | 4/2006 | Dang | |
| 2006/0082879 A1 | 4/2006 | Miyoshi et al. | |
| 2006/0130017 A1 | 6/2006 | Cohen et al. | |
| 2006/0208259 A1 | 9/2006 | Jeon | |
| 2006/0248348 A1 | 11/2006 | Wakao et al. | |
| 2006/0250322 A1 | 11/2006 | Hall et al. | |
| 2006/0256226 A1 | 11/2006 | Alon et al. | |
| 2006/0274210 A1 | 12/2006 | Kim | |
| 2006/0285741 A1 | 12/2006 | Subbarao | |
| 2007/0008317 A1 | 1/2007 | Lundstrom | |
| 2007/0019883 A1 | 1/2007 | Wong et al. | |
| 2007/0030357 A1 | 2/2007 | Levien et al. | |
| 2007/0033588 A1 | 2/2007 | Landsman | |
| 2007/0052810 A1 | 3/2007 | Monroe | |
| 2007/0071316 A1 | 3/2007 | Kubo | |
| 2007/0081081 A1 | 4/2007 | Cheng | |
| 2007/0097206 A1 | 5/2007 | Houvener et al. | |
| 2007/0103558 A1 | 5/2007 | Cai et al. | |
| 2007/0113198 A1 | 5/2007 | Robertson et al. | |
| 2007/0140676 A1 | 6/2007 | Nakahara | |
| 2007/0188613 A1 | 8/2007 | Norbori et al. | |
| 2007/0201853 A1 | 8/2007 | Petschnigg | |
| 2007/0229653 A1 | 10/2007 | Matusik et al. | |
| 2007/0230944 A1 | 10/2007 | Georgiev | |
| 2007/0269108 A1 | 11/2007 | Steinberg et al. | |
| 2007/0273795 A1 | 11/2007 | Jaynes | |
| 2008/0007626 A1 | 1/2008 | Wernersson | |
| 2008/0012988 A1 | 1/2008 | Baharav et al. | |
| 2008/0018668 A1 | 1/2008 | Yamauchi | |
| 2008/0031537 A1 | 2/2008 | Gutkowicz-Krusin et al. | |
| 2008/0049113 A1 | 2/2008 | Hirai | |
| 2008/0056569 A1 | 3/2008 | Williams et al. | |
| 2008/0122940 A1 | 5/2008 | Mori | |
| 2008/0129728 A1 | 6/2008 | Satoshi | |
| 2008/0144952 A1 | 6/2008 | Chen et al. | |
| 2008/0152215 A1 | 6/2008 | Horie et al. | |
| 2008/0168404 A1 | 7/2008 | Ording | |
| 2008/0180792 A1 | 7/2008 | Georgiev | |
| 2008/0187305 A1 | 8/2008 | Raskar et al. | |
| 2008/0193026 A1 | 8/2008 | Horie et al. | |
| 2008/0205871 A1 | 8/2008 | Utagawa | |
| 2008/0226274 A1 | 9/2008 | Spielberg | |
| 2008/0232680 A1 | 9/2008 | Berestov et al. | |
| 2008/0253652 A1 | 10/2008 | Gupta et al. | |
| 2008/0260291 A1 | 10/2008 | Alakarhu et al. | |
| 2008/0266688 A1 | 10/2008 | Errando Smet et al. | |
| 2008/0277566 A1 | 11/2008 | Utagawa | |
| 2008/0309813 A1 | 12/2008 | Watanabe | |
| 2008/0316301 A1 | 12/2008 | Givon | |
| 2009/0027542 A1 | 1/2009 | Yamamoto et al. | |
| 2009/0041381 A1 | 2/2009 | Georgiev et al. | |
| 2009/0041448 A1 | 2/2009 | Georgiev et al. | |
| 2009/0070710 A1 | 3/2009 | Kagaya | |
| 2009/0109280 A1 | 4/2009 | Gotsman | |
| 2009/0128658 A1 | 5/2009 | Hayasaka et al. | |
| 2009/0128669 A1 | 5/2009 | Ng et al. | |
| 2009/0135258 A1 | 5/2009 | Nozaki | |
| 2009/0140131 A1 | 6/2009 | Utagawa | |
| 2009/0102956 A1 | 7/2009 | Georgiev | |
| 2009/0167909 A1 | 7/2009 | Imagawa et al. | |
| 2009/0185051 A1 | 7/2009 | Sano | |
| 2009/0185801 A1 | 7/2009 | Georgiev et al. | |
| 2009/0190022 A1 | 7/2009 | Ichimura | |
| 2009/0190024 A1 | 7/2009 | Hayasaka et al. | |
| 2009/0195689 A1 | 8/2009 | Hwang et al. | |
| 2009/0202235 A1 | 8/2009 | Li et al. | |
| 2009/0204813 A1 | 8/2009 | Kwan | |
| 2009/0207233 A1 | 8/2009 | Mauchly et al. | |
| 2009/0273843 A1 | 11/2009 | Raskar et al. | |
| 2009/0290848 A1 | 11/2009 | Brown | |

(56) References Cited

U.S. PATENT DOCUMENTS

| | | |
|---|---|---|
| 2009/0295829 A1 | 12/2009 | Georgiev et al. |
| 2009/0309973 A1 | 12/2009 | Kogane |
| 2009/0309975 A1 | 12/2009 | Gordon |
| 2009/0310885 A1 | 12/2009 | Tamaru |
| 2009/0321861 A1 | 12/2009 | Oliver et al. |
| 2010/0003024 A1 | 1/2010 | Agrawal et al. |
| 2010/0011117 A1 | 1/2010 | Hristodorescu et al. |
| 2010/0021001 A1 | 1/2010 | Honsinger et al. |
| 2010/0026852 A1 | 2/2010 | Ng et al. |
| 2010/0050120 A1 | 2/2010 | Ohazama et al. |
| 2010/0060727 A1 | 3/2010 | Steinberg et al. |
| 2010/0097444 A1 | 4/2010 | Lablans |
| 2010/0103311 A1 | 4/2010 | Makii |
| 2010/0107068 A1 | 4/2010 | Butcher et al. |
| 2010/0111489 A1 | 5/2010 | Presler |
| 2010/0123784 A1 | 5/2010 | Ding et al. |
| 2010/0141780 A1 | 6/2010 | Tan et al. |
| 2010/0142839 A1 | 6/2010 | Lakus-Becker |
| 2010/0201789 A1 | 8/2010 | Yahagi |
| 2010/0253782 A1 | 10/2010 | Elazary |
| 2010/0265385 A1 | 10/2010 | Knight et al. |
| 2010/0277629 A1 | 11/2010 | Tanaka |
| 2010/0303288 A1 | 12/2010 | Malone |
| 2010/0328485 A1 | 12/2010 | Imamura et al. |
| 2011/0018903 A1 | 1/2011 | Lapstun et al. |
| 2011/0019056 A1 | 1/2011 | Hirsch et al. |
| 2011/0025827 A1 | 2/2011 | Shpunt et al. |
| 2011/0032338 A1 | 2/2011 | Raveendran et al. |
| 2011/0050864 A1 | 3/2011 | Bond |
| 2011/0050909 A1 | 3/2011 | Ellenby |
| 2011/0069175 A1 | 3/2011 | Mistretta et al. |
| 2011/0075729 A1 | 3/2011 | Dane et al. |
| 2011/0090255 A1 | 4/2011 | Wilson et al. |
| 2011/0123183 A1 | 5/2011 | Adelsberger et al. |
| 2011/0129120 A1 | 6/2011 | Chan |
| 2011/0129165 A1 | 6/2011 | Lim et al. |
| 2011/0148764 A1 | 6/2011 | Gao |
| 2011/0149074 A1 | 6/2011 | Lee et al. |
| 2011/0169994 A1 | 7/2011 | DiFrancesco et al. |
| 2011/0194617 A1 | 8/2011 | Kumar et al. |
| 2011/0205384 A1 | 8/2011 | Zamowski et al. |
| 2011/0221947 A1 | 9/2011 | Awazu |
| 2011/0242334 A1 | 10/2011 | Wilburn et al. |
| 2011/0242352 A1 | 10/2011 | Hikosaka |
| 2011/0261164 A1 | 10/2011 | Olesen et al. |
| 2011/0261205 A1 | 10/2011 | Sun |
| 2011/0267263 A1 | 11/2011 | Hinckley |
| 2011/0273466 A1 | 11/2011 | Imai et al. |
| 2011/0279479 A1* | 11/2011 | Rodriguez ............... G06F 3/011 345/633 |
| 2011/0133649 A1 | 12/2011 | Bales et al. |
| 2011/0292258 A1 | 12/2011 | Adler |
| 2011/0298960 A1 | 12/2011 | Tan et al. |
| 2011/0304745 A1 | 12/2011 | Wang et al. |
| 2011/0311046 A1 | 12/2011 | Oka |
| 2011/0316968 A1 | 12/2011 | Taguchi et al. |
| 2012/0014837 A1 | 1/2012 | Fehr et al. |
| 2012/0044330 A1 | 2/2012 | Watanabe |
| 2012/0050562 A1 | 3/2012 | Perwass et al. |
| 2012/0056889 A1 | 3/2012 | Carter et al. |
| 2012/0056982 A1 | 3/2012 | Katz et al. |
| 2012/0057040 A1 | 3/2012 | Park et al. |
| 2012/0057806 A1 | 3/2012 | Backlund et al. |
| 2012/0062755 A1 | 3/2012 | Takahashi et al. |
| 2012/0120240 A1 | 5/2012 | Muramatsu et al. |
| 2012/0132803 A1 | 5/2012 | Hirato et al. |
| 2012/0133746 A1 | 5/2012 | Bigioi et al. |
| 2012/0147205 A1 | 6/2012 | Lelescu et al. |
| 2012/0176481 A1 | 7/2012 | Lukk et al. |
| 2012/0183055 A1 | 7/2012 | Hong et al. |
| 2012/0188344 A1 | 7/2012 | Imai |
| 2012/0201475 A1 | 8/2012 | Carmel et al. |
| 2012/0206574 A1 | 8/2012 | Shikata et al. |
| 2012/0218463 A1 | 8/2012 | Benezra et al. |
| 2012/0224787 A1 | 9/2012 | Imai |
| 2012/0229691 A1 | 9/2012 | Hiasa et al. |
| 2012/0249529 A1 | 10/2012 | Matsumoto |
| 2012/0249550 A1 | 10/2012 | Akeley |
| 2012/0249819 A1 | 10/2012 | Imai |
| 2012/0251131 A1 | 10/2012 | Henderson et al. |
| 2012/0257065 A1 | 10/2012 | Velarde et al. |
| 2012/0257795 A1 | 10/2012 | Kim et al. |
| 2012/0268367 A1* | 10/2012 | Vertegaal ............... G06F 3/011 345/156 |
| 2012/0269274 A1 | 10/2012 | Kim et al. |
| 2012/0272271 A1 | 10/2012 | Nishizawa et al. |
| 2012/0287246 A1 | 11/2012 | Katayama |
| 2012/0287296 A1 | 11/2012 | Fukui |
| 2012/0287329 A1 | 11/2012 | Yahata |
| 2012/0293075 A1 | 11/2012 | Engelen et al. |
| 2012/0300091 A1 | 11/2012 | Shroff et al. |
| 2012/0237222 A9 | 12/2012 | Ng et al. |
| 2012/0321172 A1 | 12/2012 | Jachalsky et al. |
| 2013/0002902 A1 | 1/2013 | Ito |
| 2013/0002936 A1 | 1/2013 | Hirama et al. |
| 2013/0021486 A1 | 1/2013 | Richardson |
| 2013/0038696 A1 | 2/2013 | Ding et al. |
| 2013/0041215 A1 | 2/2013 | McDowall |
| 2013/0044290 A1 | 2/2013 | Kawamura |
| 2013/0050546 A1 | 2/2013 | Kano |
| 2013/0064453 A1 | 3/2013 | Nagasaka et al. |
| 2013/0064532 A1 | 3/2013 | Caldwell et al. |
| 2013/0070059 A1 | 3/2013 | Kushida |
| 2013/0070060 A1 | 3/2013 | Chatterjee et al. |
| 2013/0077880 A1 | 3/2013 | Venkataraman et al. |
| 2013/0082905 A1 | 4/2013 | Ranieri et al. |
| 2013/0088616 A1 | 4/2013 | Ingrassia, Jr. |
| 2013/0093844 A1 | 4/2013 | Shuto |
| 2013/0093859 A1 | 4/2013 | Nakamura |
| 2013/0094101 A1 | 4/2013 | Oguchi |
| 2013/0107085 A1 | 5/2013 | Ng et al. |
| 2013/0113981 A1 | 5/2013 | Knight et al. |
| 2013/0120356 A1 | 5/2013 | Georgiev et al. |
| 2013/0120605 A1 | 5/2013 | Georgiev et al. |
| 2013/0120636 A1 | 5/2013 | Baer |
| 2013/0127901 A1 | 5/2013 | Georgiev et al. |
| 2013/0128052 A1 | 5/2013 | Catrein et al. |
| 2013/0128081 A1 | 5/2013 | Georgiev et al. |
| 2013/0128087 A1 | 5/2013 | Georgiev et al. |
| 2013/0135448 A1 | 5/2013 | Nagumo et al. |
| 2013/0176481 A1 | 7/2013 | Holmes et al. |
| 2013/0188068 A1 | 7/2013 | Said |
| 2013/0215108 A1 | 8/2013 | McMahon et al. |
| 2013/0215226 A1 | 8/2013 | Chauvier et al. |
| 2013/0222656 A1 | 8/2013 | Kaneko |
| 2013/0234935 A1 | 9/2013 | Griffith |
| 2013/0242137 A1 | 9/2013 | Kirkland |
| 2013/0243391 A1 | 9/2013 | Park et al. |
| 2013/0258451 A1 | 10/2013 | El-Ghoroury et al. |
| 2013/0262511 A1 | 10/2013 | Kuffner et al. |
| 2013/0286236 A1 | 10/2013 | Mankowski |
| 2013/0321574 A1 | 12/2013 | Zhang et al. |
| 2013/0321581 A1 | 12/2013 | El-Ghoroury |
| 2013/0321677 A1 | 12/2013 | Cote et al. |
| 2013/0329107 A1 | 12/2013 | Burley et al. |
| 2013/0329132 A1 | 12/2013 | Tico et al. |
| 2013/0335596 A1 | 12/2013 | Demandoix et al. |
| 2013/0342700 A1 | 12/2013 | Kass |
| 2014/0002502 A1 | 1/2014 | Han |
| 2014/0002699 A1 | 1/2014 | Guan |
| 2014/0003719 A1 | 1/2014 | Bai et al. |
| 2014/0013273 A1 | 1/2014 | Ng |
| 2014/0035959 A1 | 2/2014 | Lapstun |
| 2014/0037280 A1 | 2/2014 | Shirakawa |
| 2014/0049663 A1 | 2/2014 | Ng et al. |
| 2014/0059462 A1 | 2/2014 | Wernersson |
| 2014/0085282 A1 | 3/2014 | Luebke et al. |
| 2014/0092424 A1 | 4/2014 | Grosz |
| 2014/0098191 A1 | 4/2014 | Rime et al. |
| 2014/0132741 A1 | 5/2014 | Aagaard et al. |
| 2014/0133749 A1 | 5/2014 | Kuo et al. |
| 2014/0139538 A1 | 5/2014 | Barber et al. |
| 2014/0167196 A1 | 6/2014 | Heimgartner et al. |
| 2014/0176540 A1 | 6/2014 | Tosio et al. |

(56) References Cited

U.S. PATENT DOCUMENTS

| | | |
|---|---|---|
| 2014/0176592 A1 | 6/2014 | Wilburn et al. |
| 2014/0176710 A1 | 6/2014 | Brady |
| 2014/0177905 A1 | 6/2014 | Grefalda |
| 2014/0184885 A1 | 7/2014 | Tanaka et al. |
| 2014/0192208 A1 | 7/2014 | Okincha |
| 2014/0193047 A1 | 7/2014 | Grosz |
| 2014/0195921 A1 | 7/2014 | Grosz |
| 2014/0204111 A1 | 7/2014 | Vaidyanathan et al. |
| 2014/0211077 A1 | 7/2014 | Ng et al. |
| 2014/0218540 A1 | 8/2014 | Geiss et al. |
| 2014/0226038 A1 | 8/2014 | Kimura |
| 2014/0240463 A1 | 8/2014 | Pitts et al. |
| 2014/0240578 A1 | 8/2014 | Fishman et al. |
| 2014/0245367 A1 | 8/2014 | Sasaki |
| 2014/0267243 A1 | 9/2014 | Venkataraman et al. |
| 2014/0267639 A1 | 9/2014 | Tatsuta |
| 2014/0300753 A1 | 10/2014 | Yin |
| 2014/0313350 A1 | 10/2014 | Keelan |
| 2014/0313375 A1 | 10/2014 | Milnar |
| 2014/0333787 A1 | 11/2014 | Venkataraman |
| 2014/0340390 A1 | 11/2014 | Lanman et al. |
| 2014/0347540 A1 | 11/2014 | Kang |
| 2014/0354863 A1 | 12/2014 | Ahn et al. |
| 2014/0368494 A1 | 12/2014 | Sakharnykh et al. |
| 2014/0368640 A1 | 12/2014 | Strandemar et al. |
| 2015/0042767 A1 | 2/2015 | Ciurea |
| 2015/0049915 A1 | 2/2015 | Ciurea et al. |
| 2015/0062178 A1 | 3/2015 | Matas et al. |
| 2015/0062386 A1 | 3/2015 | Sugawara |
| 2015/0092071 A1 | 4/2015 | Meng et al. |
| 2015/0097985 A1 | 4/2015 | Akeley |
| 2015/0161798 A1 | 6/2015 | Venkataraman et al. |
| 2015/0193937 A1 | 7/2015 | Georgiev et al. |
| 2015/0206340 A1 | 7/2015 | Munkberg et al. |
| 2015/0207990 A1 | 7/2015 | Ford et al. |
| 2015/0223731 A1 | 8/2015 | Sahin |
| 2015/0237273 A1 | 8/2015 | Sawadaishi |
| 2015/0264337 A1 | 9/2015 | Venkataraman et al. |
| 2015/0104101 A1 | 10/2015 | Bryant et al. |
| 2015/0304667 A1 | 10/2015 | Suehring et al. |
| 2015/0310592 A1 | 10/2015 | Kano |
| 2015/0312553 A1 | 10/2015 | Ng et al. |
| 2015/0312593 A1 | 10/2015 | Akeley et al. |
| 2015/0334420 A1 | 11/2015 | De Vieeschauwer et al. |
| 2015/0346832 A1* | 12/2015 | Cole .................. H04N 19/597 345/156 |
| 2015/0370011 A1 | 12/2015 | Ishihara |
| 2015/0370012 A1 | 12/2015 | Ishihara |
| 2015/0373279 A1 | 12/2015 | Osborne |
| 2016/0029002 A1 | 1/2016 | Balko |
| 2016/0029017 A1 | 1/2016 | Liang |
| 2016/0037178 A1 | 2/2016 | Lee et al. |
| 2016/0065931 A1 | 3/2016 | Konieczny |
| 2016/0065947 A1* | 3/2016 | Cole .................. H04N 13/239 348/43 |
| 2016/0142615 A1 | 5/2016 | Liang |
| 2016/0155215 A1 | 6/2016 | Suzuki |
| 2016/0165206 A1 | 6/2016 | Huang et al. |
| 2016/0173844 A1 | 6/2016 | Knight et al. |
| 2016/0182893 A1 | 6/2016 | Wan |
| 2016/0191823 A1 | 6/2016 | El-Ghoroury |
| 2016/0227244 A1 | 8/2016 | Rosewarne |
| 2016/0247324 A1 | 8/2016 | Mullins et al. |
| 2016/0253837 A1 | 9/2016 | Zhu et al. |
| 2016/0269620 A1 | 9/2016 | Romanenko et al. |
| 2016/0307368 A1 | 10/2016 | Akeley |
| 2016/0307372 A1 | 10/2016 | Pitts et al. |
| 2016/0309065 A1 | 10/2016 | Karafin et al. |
| 2016/0337635 A1 | 11/2016 | Nisenzon |
| 2016/0353026 A1 | 12/2016 | Blonde et al. |
| 2016/0381348 A1 | 12/2016 | Hayasaka |
| 2017/0059305 A1 | 3/2017 | Nonn et al. |
| 2017/0067832 A1 | 3/2017 | Ferrara, Jr. et al. |
| 2017/0094906 A1 | 3/2017 | Liang et al. |
| 2017/0134639 A1 | 5/2017 | Pitts et al. |
| 2017/0139131 A1 | 5/2017 | Karafin et al. |
| 2017/0221226 A1 | 8/2017 | Shen |
| 2017/0237971 A1 | 8/2017 | Pitts |
| 2017/0243373 A1 | 8/2017 | Bevensee et al. |
| 2017/0244948 A1 | 8/2017 | Pang et al. |
| 2017/0256036 A1 | 9/2017 | Song et al. |
| 2017/0263012 A1 | 9/2017 | Sabater et al. |
| 2017/0302903 A1 | 10/2017 | Ng et al. |
| 2017/0316602 A1 | 11/2017 | Smirnov et al. |
| 2017/0358092 A1 | 12/2017 | Bleibel et al. |
| 2017/0365068 A1 | 12/2017 | Tan et al. |
| 2017/0374411 A1* | 12/2017 | Lederer .................. G06F 3/01 |
| 2018/0012397 A1 | 1/2018 | Carothers |
| 2018/0020204 A1 | 1/2018 | Pang et al. |
| 2018/0025753 A1* | 1/2018 | Gewickey ............ H04N 13/025 386/223 |
| 2018/0033209 A1 | 2/2018 | Akeley et al. |
| 2018/0034134 A1 | 2/2018 | Pang et al. |
| 2018/0139436 A1 | 2/2018 | Yucer et al. |
| 2018/0070066 A1 | 3/2018 | Knight et al. |
| 2018/0070067 A1 | 3/2018 | Knight et al. |
| 2018/0082405 A1 | 3/2018 | Liang |
| 2018/0089903 A1 | 3/2018 | Pang et al. |
| 2018/0097867 A1 | 4/2018 | Pang et al. |
| 2018/0124371 A1 | 5/2018 | Kamal et al. |
| 2018/0158198 A1 | 6/2018 | Karnad |

FOREIGN PATENT DOCUMENTS

| | | |
|---|---|---|
| DE | 19624421 | 1/1997 |
| JP | 2010020100 | 1/2010 |
| JP | 2011135170 | 7/2011 |
| WO | 2003052465 | 6/2003 |
| WO | 2006039486 | 4/2006 |
| WO | 2007092545 | 8/2007 |
| WO | 2007092581 | 8/2007 |
| WO | 2011010234 | 3/2011 |
| WO | 2011029209 | 3/2011 |
| WO | 2011081187 | 7/2011 |

OTHER PUBLICATIONS

Georgiev, T., et al., "Unified Frequency Domain Analysis of Lightfield Cameras" (2008).

Georgiev, T., et al., Plenoptic Camera 2.0 (2008).

Girod, B., "Mobile Visual Search", IEEE Signal Processing Magazine, Jul. 2011.

Gortler et al., "The lumigraph" SIGGRAPH 96, pp. 43-54.

Groen et al., "A Comparison of Different Focus Functions for Use in Autofocus Algorithms," Cytometry 6:81-91, 1985.

Haeberli, Paul "A Multifocus Method for Controlling Depth of Field" GRAPHICA Obscura, 1994, pp. 1-3.

Heide, F. et al., "High-Quality Computational Imaging Through Simple Lenses," ACM Transactions on Graphics, SIGGRAPH 2013; pp. 1-7.

Heidelberg Collaboratory for Image Processing, "Consistent Depth Estimation in a 4D Light Field," May 2013.

Hirigoyen, F., et al., "1.1 um Backside Imager vs. Frontside Image: an optics-dedicated FDTD approach", IEEE 2009 International Image Sensor Workshop.

Huang, Fu-Chung et al., "Eyeglasses-free Display: Towards Correcting Visual Aberrations with Computational Light Field Displays," ACM Transaction on Graphics, Aug. 2014, pp. 1-12.

Isaksen, A., et al., "Dynamically Reparameterized Light Fields," SIGGRAPH 2000, pp. 297-306.

Ives H., "Optical properties of a Lippman lenticulated sheet," J. Opt. Soc. Am. 21, 171 (1931).

Ives, H. "Parallax Panoramagrams Made with a Large Diameter Lens", Journal of the Optical Society of America; 1930.

Jackson et al., "Selection of a Convolution Function for Fourier Inversion Using Gridding" IEEE Transactions on Medical Imaging, Sep. 1991, vol. 10, No. 3, pp. 473-478.

Kautz, J., et al., "Fast arbitrary BRDF shading for low-frequency lighting using spherical harmonics", in Eurographic Rendering Workshop 2002, 291-296.

(56) References Cited

OTHER PUBLICATIONS

Koltun, et al., "Virtual Occluders: An Efficient Interediate PVS Representation", Rendering Techniques 2000: Proc. 11th Eurographics Workshop Rendering, pp. 59-70, Jun. 2000.
Kopf, J., et al., Deep Photo: Model-Based Photograph Enhancement and Viewing, SIGGRAPH Asia 2008.
Lehtinen, J., et al. "Matrix radiance transfer", in Symposium on Interactive 3D Graphics, 59-64, 2003.
Lesser, Michael, "Back-Side Illumination", 2009.
Levin, A., et al., "Image and Depth from a Conventional Camera with a Coded Aperture", SIGGRAPH 2007, pp. 1-9.
Levoy et al.,"Light Field Rendering" SIGGRAPH 96 Proceeding, 1996. pp. 31-42.
Levoy, "Light Fields and Computational Imaging" IEEE Computer Society, Aug. 2006, pp. 46-55.
Levoy, M. "Light Field Photography and Videography," Oct. 18, 2005.
Levoy, M. "Stanford Light Field Microscope Project," 2008; http://graphics.stanford.edu/projects/lfmicroscope/, 4 pages.
Levoy, M., "Autofocus: Contrast Detection", http://graphics.stanford.edu/courses/cs178/applets/autofocusPD.html, pp. 1-3, 2010.
Levoy, M., "Autofocus: Phase Detection", http://graphics.stanford.edu/courses/cs178/applets/autofocusPD.html, pp. 1-3, 2010.
Levoy, M., et al., "Light Field Microscopy," ACM Transactions on Graphics, vol. 25, No. 3, Proceedings SIGGRAPH 2006.
Liang, Chia-Kai, et al., "Programmable Aperture Photography: Multiplexed Light Field Acquisition", ACM SIGGRAPH, 2008.
Lippmann, "Reversible Prints", Communication at the French Society of Physics, Journal of Physics, 7 , Mar. 4, 1908, pp. 821-825.
Lumsdaine et al., "Full Resolution Lighffield Rendering" Adobe Technical Report Jan. 2008, pp. 1-12.
Maeda, Y. et al., "A CMOS Image Sensor with Pseudorandom Pixel Placement for Clear Imaging," 2009 International Symposium on Intelligent Signal Processing and Communication Systems, Dec. 2009.
Magnor, M. et al., "Model-Aided Coding of Multi-Viewpoint Image Data," Proceedings IEEE Conference on Image Processing, ICIP-2000, Vancouver, Canada, Sep. 2000. https://graphics.tu-bs.de/static/people/magnor/publications/icip00.pdf.
Mallat, Stephane, "A Wavelet Tour of Signal Processing", Academic Press 1998.
Malzbender, et al., "Polynomial Texture Maps", Proceedings SIGGRAPH 2001.
Marshall, Richard J. et al., "Improving Depth Estimation from a Plenoptic Camera by Patterned Illumination," Proc. of SPIE, vol. 9528, 2015, pp. 1-6.
Masselus, Vincent, et al., "Relighting with 4D Incident Light Fields", SIGGRAPH 2003.
Meynants, G., et al., "Pixel Binning in CMOS Image Sensors," Frontiers in Electronic Imaging Conference, 2009.
Moreno-Noguer, F. et al., "Active Refocusing of Images and Videos," ACM Transactions on Graphics, Aug. 2007; pp. 1-9.
Munkberg, J. et al., "Layered Reconstruction for Defocus and Motion Blur" EGSR 2014, pp. 1-12.
Naemura et al., "3-D Computer Graphics based on Integral Photography" Optics Express, Feb. 12, 2001. vol. 8, No. 2, pp. 255-262.
Nakamura, J., "Image Sensors and Signal Processing for Digital Still Cameras" (Optical Science and Engineering), 2005.
National Instruments, "Anatomy of a Camera," pp. 1-5, Sep. 6, 2006.
Nayar, Shree, et al., "Shape from Focus", IEEE Transactions on Pattern Analysis and Machine Intelligence, vol. 16, No. 8, pp. 824-831, Aug. 1994.
Ng, R., et al. "Light Field Photography with a Hand-held Plenoptic Camera," Stanford Technical Report, CSTR 2005-2, 2005.
Ng, R., et al., "All-Frequency Shadows Using Non-linear Wavelet Lighting Approximation. ACM Transactions on Graphics," ACM Transactions on Graphics; Proceedings of SIGGRAPH 2003.
Ng, R., et al., "Triple Product Wavelet Integrals for All-Frequency Relighting", ACM Transactions on Graphics (Proceedings of SIGGRAPH 2004).
Ng, Yi-Ren, "Digital Light Field Photography," Doctoral Thesis, Standford University, Jun. 2006; 203 pages.
Ng., R., "Fourier Slice Photography," ACM Transactions on Graphics, Proceedings of SIGGRAPH 2005, vol. 24, No. 3, 2005, pp. 735-744.
Nguyen, Hubert. "Practical Post-Process Depth of Field." GPU Gems 3. Upper Saddle River, NJ: Addison-Wesley, 2008.
Nimeroff, J., et al., "Efficient rendering of naturally illuminatied environments" in Fifth Eurographics Workshop on Rendering, 359-373, 1994.
Nokia, "City Lens", May 2012.
Ogden, J., "Pyramid-Based Computer Graphics", 1985.
Okano et al., "Three-dimensional video system based on integral photography" Optical Engineering, Jun. 1999. vol. 38, No. 6, pp. 1072-1077.
Orzan, Alexandrina, et al., "Diffusion Curves: A Vector Representation for Smooth-Shaded Images," ACM Transactions on Graphics—Proceedings of SIGGRAPH 2008; vol. 27; 2008.
Pain, B., "Back-Side Illumination Technology for SOI-CMOS Image Sensors", 2009.
Perez, Patrick et al., "Poisson Image Editing," ACM Transactions on Graphics—Proceedings of ACM SIGGRAPH 2003; vol. 22, Issue 3; Jul. 2003; pp. 313-318.
Petschnigg, George, et al., "Digial Photography with Flash and No-Flash Image Pairs", SIGGRAPH 2004.
Primesense, "The Primesense 3D Awareness Sensor", 2007.
Ramamoorthi, R., et al, "Frequency space environment map rendering" ACM Transactions on Graphics (SIGGRAPH 2002 proceedings) 21, 3, 517-526.
Ramamoorthi, R., et al., "An efficient representation for irradiance environment maps", in Proceedings of SIGGRAPH 2001, 497-500.
Raskar, Ramesh et al., "Glare Aware Photography: 4D Ray Sampling for Reducing Glare Effects of Camera Lenses," ACM Transactions on Graphics—Proceedings of ACM SIGGRAPH, Aug. 2008; vol. 27, Issue 3; pp. 1-10.
Raskar, Ramesh et al., "Non-photorealistic Camera: Depth Edge Detection and Stylized Rendering using Multi-Flash Imaging", SIGGRAPH 2004.
Raytrix, "Raytrix Lightfield Camera," Raytrix GmbH, Germany 2012, pp. 1-35.
Roper Scientific, Germany "Fiber Optics," 2012.
Scharstein, Daniel, et al., "High-Accuracy Stereo Depth Maps Using Structured Light," CVPR'03 Proceedings of the 2003 IEEE Computer Society, pp. 195-202.
Schirmacher, H. et al., "High-Quality Interactive Lumigraph Rendering Through Warping," May 2000, Graphics Interface 2000.
Shade, Jonathan, et al., "Layered Depth Images", SIGGRAPH 98, pp. 1-2.
Shreiner, OpenGL Programming Guide, 7th edition, Chapter 8, 2010.
Simpleviewer, "Tiltview", http://simpleviewer.net/tiltviewer. Retrieved Jan. 2013.
Skodras, A. et al., "The JPEG 2000 Still Image Compression Standard," Sep. 2001, IEEE Signal Processing Magazine, pp. 36-58.
Sloan, P., et al., "Precomputed radiance transfer for real-time rendering in dynamic, low-frequency lighting environments", ACM Transactions on Graphics 21, 3, 527-536, 2002.
Snavely, Noah, et al., "Photo-tourism: Exploring Photo collections in 3D", ACM Transactions on Graphics (SIGGRAPH Proceedings), 2006.
Sokolov, "Autostereoscopy and Integral Photography by Professor Lippmann's Method", 1911, pp. 23-29.
Sony Corp, "Interchangeable Lens Digital Camera Handbook", 2011.
Sony, Sony's First Curved Sensor Photo: http://www.engadget.com; Jul. 2014.
Stensvold, M., "Hybrid AF: A New Approach to Autofocus Is Emerging for both Still and Video", Digital Photo Magazine, Nov. 13, 2012.

(56) References Cited

OTHER PUBLICATIONS

Story, D., "The Future of Photography", Optics Electronics, Oct. 2008.
Sun, Jian, et al., "Stereo Matching Using Belief Propagation", 2002.
Tagging photos on Flickr, Facebook and other online photo sharing sites (see, for example, http://support.gnip.com/customer/portal/articles/809309-flickr-geo-photos-tag-search). Retrieved Jan. 2013.
Takahashi, Keita, et al., "All in-focus View Synthesis from Under-Sampled Light Fields", ICAT 2003, Tokyo, Japan.
Tanida et al., "Thin observation module by bound optics (TOMBO): concept and experimental verification" Applied Optics 40, 11 (Apr. 10, 2001), pp. 1806-1813.
Tao, Michael, et al., "Depth from Combining Defocus and Correspondence Using Light-Field Cameras", Dec. 2013.
Techcrunch, "Coolinis", Retrieved Jan. 2013.
Teo, P., et al., "Efficient linear rendering for interactive light design", Tech. Rep. STAN-CS-TN-97-60, 1998, Stanford University.
Teranishi, N. "Evolution of Optical Structure in Images Sensors," Electron Devices Meeting (IEDM) 2012 IEEE International; Dec. 10-13, 2012.
Vaish et al., "Using plane + parallax for calibrating dense camera arrays", In Proceedings CVPR 2004, pp. 2-9.
Vaish, V., et al., "Synthetic Aperture Focusing Using a Shear-Warp Factorization of the Viewing Transform," Workshop on Advanced 3D Imaging for Safety and Security (in conjunction with CVPR 2005), 2005.
VR Playhouse, "The Surrogate," http://www.vrplayhouse.com/the-surrogate.
Wanner, S. et al., "Globally Consistent Depth Labeling of 4D Light Fields," IEEE Conference on Computer Vision and Pattern Recognition, 2012.
Wanner, S. et al., "Variational Light Field Analysis for Disparity Estimation and Super-Resolution," IEEE Transacations on Pattern Analysis and Machine Intellegence, 2013.
Wenger, et al, "Performance Relighting and Reflectance Transformation with Time-Multiplexed Illumination", Institute for Creative Technologies, SIGGRAPH 2005.
Wetzstein, Gordon, et al., "Sensor Saturation in Fourier Multiplexed Imaging", IEEE Conference on Computer Vision and Pattern Recognition (2010).
Wikipedia—Adaptive Optics: http://en.wikipedia.org/wiki/adaptive_optics. Retrieved Feb. 2014.
Wikipedia—Autofocus systems and methods: http://en.wikipedia.org/wiki/Autofocus. Retrieved Jan. 2013.
Wikipedia—Bayer Filter: http:/en.wikipedia.org/wiki/Bayer_filter. Retrieved Jun. 20, 2013.
Wikipedia—Color Image Pipeline: http://en.wikipedia.org/wiki/color_image_pipeline. Retrieved Jan. 15, 2014.
Wikipedia—Compression standard JPEG XR: http://en.wikipedia.org/wiki/JPEG_XR. Retrieved Jan. 2013.
Wikipedia—CYGM Filter: http://en.wikipedia.org/wiki/CYGM_filter. Retrieved Jun. 20, 2013.
U.S. Appl. No. 15/967,076, filed Apr. 30, 2018 listing Jiantao Kuang et al. as inventors, entitled "Automatic Lens Flare Detection and Correction for Light-Field Images".
U.S. Appl. No. 15/666,298, filed Aug. 1, 2017 listing Yonggang Ha et al. as inventors, entitled "Focal Reducer With Controlled Optical Properties for Interchangeable Lens Light-Field Camera".
U.S. Appl. No. 15/864,938, filed Jan. 8, 2018 listing Jon Karafin et al. as inventors, entitled "Motion Blur for Light-Field Images".
U.S. Appl. No. 15/703,553, filed Sep. 13, 2017 listing Jon Karafin et al. as inventors, entitled "4D Camera Tracking and Optical Stabilization".
U.S. Appl. No. 15/590,841, filed May 9, 2017 listing Kurt Akeley et al. as inventors, entitled "Vantage Generation and Interactive Playback".
U.S. Appl. No. 15/590,951, filed May 9, 2017 listing Alex Song et al. as inventors, entitled "Wedge-Based Light-Field Video Capture".
U.S. Appl. No. 15/944,551, filed Apr. 3, 2018 listing Zejing Wang et al. as inventors, entitled "Generating Dolly Zoom Effect Using Light Field Image Data".
U.S. Appl. No. 15/874,723, filed Jan. 18, 2018 listing Mark Weir et al. as inventors, entitled "Multi-Camera Navigation Interface".
U.S. Appl. No. 15/897,994, filed Feb. 15, 2018 listing Trevor Carothers et al. as inventors, entitled "Generation of Virtual Reality With 6 Degrees of Freesom From Limited Viewer Data".
U.S. Appl. No. 15/605,037, filed May 25, 2017 listing Zejing Wang et al. as inventors, entitled "Multi-View Back-Projection to a Light-Field".
U.S. Appl. No. 15/897,836, filed Feb. 15, 2018 listing Francois Bleibel et al. as inventors, entitled "Multi-View Contour Tracking".
U.S. Appl. No. 15/897,942, filed Feb. 15, 2018 listing Francois Bleibel et al. as inventors, entitled "Multi-View Contour Tracking With Grabcut".
Adelsberger, R. et al., "Spatially Adaptive Photographic Flash," ETH Zurich, Department of Computer Science, Technical Report 612, 2008, pp. 1-12.
Adelson et al., "Single Lens Stereo with a Plenoptic Camera" IEEE Translation on Pattern Analysis and Machine Intelligence, Feb. 1992. vol. 14, No. 2, pp. 99-106.
Adelson, E. H., and Bergen, J. R. 1991. The plenoptic function and the elements of early vision. In Computational Models of Visual Processing, edited by Michael S. Landy and J. Anthony Movshon. Cambridge, Mass.: mit Press.
Adobe Systems Inc, "XMP Specification", Sep. 2005.
Adobe, "Photoshop CS6 / in depth: Digital Negative (DNG)", http://www.adobe.com/products/photoshop/extend.displayTab2html. Retrieved Jan. 2013.
Agarwala, A., et al., "Interactive Digital Photomontage," ACM Transactions on Graphics, Proceedings of SIGGRAPH 2004, vol. 32, No. 3, 2004.
Andreas Observatory, Spectrograph Manual: IV. Flat-Field Correction, Jul. 2006.
Apple, "Apple iPad: Photo Features on the iPad", Retrieved Jan. 2013.
Bae, S., et al., "Defocus Magnification", Computer Graphics Forum, vol. 26, Issue 3 (Proc. of Eurographics 2007), pp. 1-9.
Belhumeur, Peter et al., "The Bas-Relief Ambiguity", International Journal of Computer Vision, 1997, pp. 1060-1066.
Belhumeur, Peter, et al., "The Bas-Relief Ambiguity", International Journal of Computer Vision, 1999, pp. 33-44, revised version.
Bhat, P. et al. "GradientShop: A Gradient-Domain Optimization Framework for Image and Video Filtering," SIGGRAPH 2010; 14 pages.
Bolles, R., et al., "Epipolar-Plane Image Analysis: An Approach to Determining Structure from Motion", International Journal of Computer Vision, 1, 7-55 (1987).
Bourke, Paul, "Image filtering in the Frequency Domain," pp. 1-9, Jun. 1998.
Canon, Canon Speedlite wireless flash system, User manual for Model 550EX, Sep. 1998.
Chai, Jin-Xang et al., "Plenoptic Sampling", ACM SIGGRAPH 2000, Annual Conference Series, 2000, pp. 307-318.
Chen, S. et al., "A CMOS Image Sensor with On-Chip Image Compression Based on Predictive Boundary Adaptation and Memoryless QTD Algorithm," Very Large Scalee Integration (VLSI) Systems, IEEE Transactions, vol. 19, Issue 4; Apr. 2011.
Chen, W., et al., "Light Field mapping: Efficient representation and hardware rendering of surface light fields", ACM Transactions on Graphics 21, 3, 447-456, 2002.
Cohen, Noy et al., "Enhancing the performance of the light field microscope using wavefront coding," Optics Express, vol. 22, issue 20; 2014.
Daly, D., "Microlens Arrays" Retrieved Jan. 2013.
Debevec, et al, "A Lighting Reproduction Approach to Live-Action Compoisting" Proceedings SIGGRAPH 2002.
Debevec, P., et al., "Acquiring the reflectance field of a human face", SIGGRAPH 2000.
Debevec, P., et al., "Recovering high dynamic radiance maps from photographs", SIGGRAPH 1997, 369-378.
Design of the xBox menu. Retrieved Jan. 2013.

(56) References Cited

OTHER PUBLICATIONS

Digital Photography Review, "Sony Announce new RGBE CCD," Jul. 2003.
Dorsey, J., et al., "Design and simulation of opera light and projection effects", in Computer Graphics (Proceedings of SIGGRAPH 91), vol. 25, 41-50.
Dorsey, J., et al., "Interactive design of complex time dependent lighting", IEEE Computer Graphics and Applications 15, (Mar. 2, 1995), 26-36.
Dowski et al., "Wavefront coding: a modern method of achieving high performance and/or low cost imaging systems" SPIE Proceedings, vol. 3779, Jul. 1999, pp. 137-145.
Dowski, Jr. "Extended Depth of Field Through Wave-Front Coding," Applied Optics, vol. 34, No. 11, Apr. 10, 1995; pp. 1859-1866.
Duparre, J. et al., "Micro-Optical Artificial Compound Eyes," Institute of Physics Publishing, Apr. 2006.
Eisemann, Elmar, et al., "Flash Photography Enhancement via Intrinsic Relighting", SIGGRAPH 2004.
Fattal, Raanan, et al., "Multiscale Shape and Detail Enhancement from Multi-light Image Collections", SIGGRAPH 2007.
Fernando, Randima, "Depth of Field—A Survey of Techniques," GPU Gems. Boston, MA; Addison-Wesley, 2004.
Fitzpatrick, Brad, "Camlistore", Feb. 1, 2011.
Fujifilm, Super CCD EXR Sensor by Fujifilm, brochure reference No. EB-807E, 2008.
Georgiev, T. et al., "Reducing Plenoptic Camera Artifacts," Computer Graphics Forum, vol. 29, No. 6, pp. 1955-1968; 2010.
Georgiev, T., et al., "Spatio-Angular Resolution Tradeoff in Integral Photography," Proceedings of Eurographics Symposium on Rendering, 2006.
Wikipedia—Data overlay techniques for real-time visual feed. For example, heads-up displays: http://en.wikipedia.org/wiki/Head-up_display. Retrieved Jan. 2013.
Wikipedia—Exchangeable image file format: http://en.wikipedia.org/wiki/Exchangeable_image_file_format. Retrieved Jan. 2013.
Wikipedia—Expeed: http://en.wikipedia.org/wiki/EXPEED. Retrieved Jan. 15, 2014.
Wikipedia—Extensible Metadata Platform: http://en.wikipedia.org/wiki/Extensible_Metadata_Platform. Retrieved Jan. 2013.
Wikipedia—Key framing for video animation: http://en.wikipedia.org/wiki/Key_frame. Retrieved Jan. 2013.
Wikipedia—Lazy loading of image data: http://en.wikipedia.org/wiki/Lazy_loading. Retrieved Jan. 2013.
Wikipedia—Methods of Variable Bitrate Encoding: http://en.wikipedia.org/wiki/Variable_bitrate#Methods_of_VBR_encoding. Retrieved Jan. 2013.
Wikipedia—Portable Network Graphics format: http://en.wikipedia.org/wiki/Portable_Network_Graphics. Retrieved Jan. 2013.
Wikipedia—Unsharp Mask Technique: https://en.wikipedia.org/wiki/Unsharp_masking. Retrieved May 3, 2016.
Wilburn et al., "High Performance Imaging using Large Camera Arrays", ACM Transactions on Graphics (TOG), vol. 24, Issue 3 (Jul. 2005), Proceedings of ACM SIGGRAPH 2005, pp. 765-776.
Wilburn, Bennett, et al., "High Speed Video Using a Dense Camera Array", 2004.
Wilburn, Bennett, et al., "The Light Field Video Camera", Proceedings of Media Processors 2002.
Williams, L. "Pyramidal Parametrics," Computer Graphic (1983).
Winnemoller, H., et al., "Light Waving: Estimating Light Positions From Photographs Alone", Eurographics 2005.
Wippermann, F. "Chirped Refractive Microlens Array," Dissertation 2007.
Wuu, S., et al., "A Manufacturable Back-Side Illumination Technology Using Bulk Si Substrate for Advanced CMOS Image Sensors", 2009 International Image Sensor Workshop, Bergen, Norway.
Wuu, S., et al., "BSI Technology with Bulk Si Wafer", 2009 International Image Sensor Workshop, Bergen, Norway.
Xiao, Z. et al., "Aliasing Detection and Reduction in Plenoptic Imaging," IEEE Conference on Computer Vision and Pattern Recognition; 2014.
Xu, Xin et al., "Robust Automatic Focus Algorithm for Low Contrast Images Using a New Contrast Measure," Sensors 2011; 14 pages.
Zheng, C. et al., "Parallax Photography: Creating 3D Cinematic Effects from Stills", Proceedings of Graphic Interface, 2009.
Zitnick, L. et al., "High-Quality Video View Interpolation Using a Layered Representation," Aug. 2004; ACM Transactions on Graphics (TOG), Proceedings of ACM SIGGRAPH 2004; vol. 23, Issue 3; pp. 600-608.
Zoberbier, M., et al., "Wafer Cameras—Novel Fabrication and Packaging Technologies", 2009 International Image Senor Workshop, Bergen, Norway, 5 pages.

* cited by examiner

ADAPTIVE CONTROL FOR IMMERSIVE EXPERIENCE DELIVERY

CROSS-REFERENCE TO RELATED APPLICATIONS

The present application is related to U.S. application Ser. No. 15/590,841 for "Vantage Generation and Interactive Playback," filed on May 9, 2017, the disclosure of which is incorporated herein by reference.

The present application is also related to U.S. application Ser. No. 15/590,877 for "Spatial Random Access Enabled Video System with a Three-Dimensional Viewing Volume," filed on May 9, 2017, the disclosure of which is incorporated herein by reference.

The present application is also related to U.S. application Ser. No. 15/590,951 for "Wedge-Based Light-Field Video Capture," filed on May 9, 2017, the disclosure of which is incorporated herein by reference.

TECHNICAL FIELD

The present document relates to the use of importance metrics to streamline the capture, storage, delivery, and/or rendering of video data for an immersive experience such as virtual reality or augmented reality.

BACKGROUND

As better and more immersive display devices are created for providing virtual reality (VR) and augmented reality (AR) environments, it is desirable to be able to capture high quality imagery and video for these systems. In a stereo VR environment, a user sees separate views for each eye; also, the user may turn and move his or her head while viewing. As a result, it is desirable that the user receive high-resolution stereo imagery that is consistent and correct for any viewing position and orientation in the volume within which a user may move his or her head.

The most immersive virtual reality and augmented reality experiences have six degrees of freedom, parallax, and view-dependent lighting. The resulting video data can be quite voluminous, requiring significant resources in terms of storage, delivery bandwidth, and/or processing power. These resources are often constrained, for example, by the processing power of the user's computer, the storage capacity of the user's computer, the bandwidth of the user's connection to a data source, and/or other factors. Such factors significantly limit the quality of the viewer's experience.

SUMMARY

Various embodiments of the described system and method utilize importance metrics to indicate the relative likelihood and/or desirability of viewing different portions of video data. For example, a first portion of the video data for a virtual reality or augmented reality experience may have a first importance metric, and a second portion of the video data may have a second importance metric. A difference between the first and second importance metrics may denote that the first portion is more likely to be viewed and/or preferred for viewing, relative to the second portion.

A subset of the video data may be retrieved and used to generate viewpoint video from a virtual viewpoint corresponding to a viewer's actual viewpoint. Storage, retrieval, and/or generation of the viewpoint video may be carried out with respect to the importance metrics, such that one or more of these tasks are expedited and/or enhanced for the first portion, relative to the second portion.

In some embodiments, the video data may be divided into a plurality of vantage video data sets, each of which represents a view from one of a plurality of vantages within a viewing volume containing the virtual viewpoint. The position of the viewer's viewpoint may be used to determine which vantage video data sets will be used to generate the viewpoint video. The first and second portions of the video data may each include one or more of the vantages, such that some vantages are expedited and/or enhanced for storage, retrieval, and/or processing, relative to other vantages.

Additionally or alternatively, the first portion of the video data may be for a first region of the viewing volume, and the second portion of the video data may be for a second region of the viewing volume. Various parameters such as a number of vantages, a density of vantages, locations of vantages, a number of vantages used to generate the viewpoint video, lighting applied to vantages, and resolution of vantages may be enhanced for the first region, relative to the second volume.

Further, each vantage may be divided into a plurality of tiles, each of which represents the view from the vantage along a viewing direction. The orientation of the viewer's viewpoint may be used to determine which tiles will be used to generate the viewpoint video. The first and second portions of the video data may each include one or more of the tiles for each of a plurality of the vantages, such that some tiles are expedited and/or enhanced for storage, retrieval, and/or processing, relative to other tiles.

Additionally or alternatively, the first portion of the video data may be for a first set of tiles oriented along a first set of viewing directions, and the second portion of the video data may be for a second set of tiles oriented along a second set of viewing directions. Various parameters such as tile spatial resolution, tile temporal resolution, tile color depth, and tile bit rate may be enhanced for the first set of tiles, relative to the second set of tiles.

The importance metrics may be established in a wide variety of ways. For example, the importance metric may be based on viewing data indicating which portions of the experience have been viewed or preferred by more viewers, user input from an author of the experience indicating which portions are more likely or desirable for viewing and/or which portions correspond to other stimuli presented as part of the experience, and/or analysis of the video data and/or accompanying audio data that determines which portions are more likely or desirable for viewing.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

DETAILED DESCRIPTION

Figure 1:
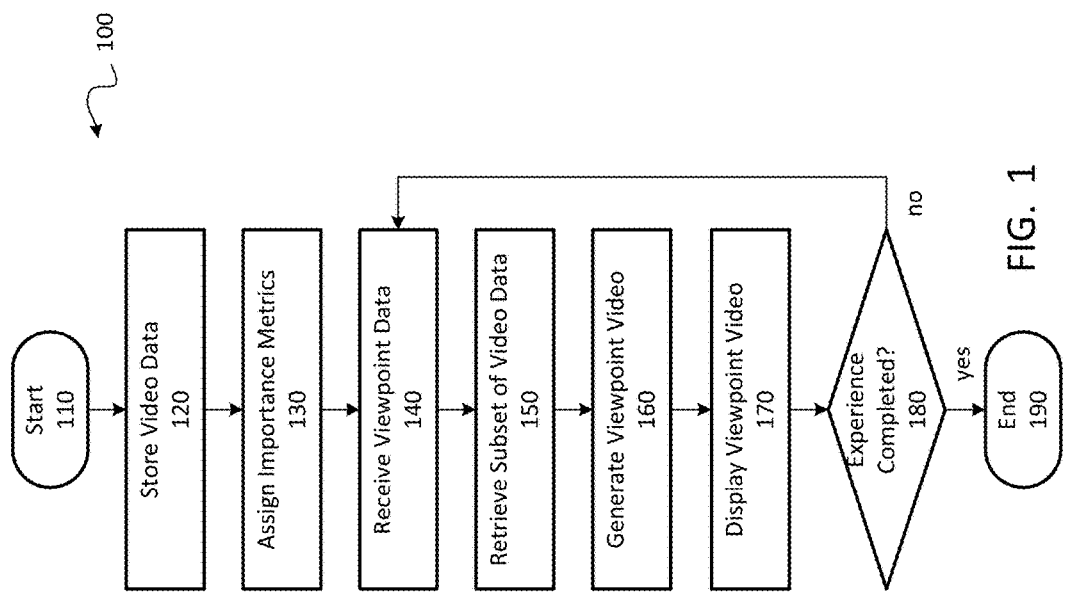
FIG. 1 is a flow diagram depicting a method for delivering video for a virtual reality or augmented reality experience, according to one embodiment.

Multiple methods for capturing image and/or video data in a light-field volume and creating virtual views from such data are described. The described embodiments may provide for capturing continuous or nearly continuous light-field data from many or all directions facing away from the capture system, which may enable the generation of virtual views that are more accurate and/or allow viewers greater viewing freedom.

Definitions

For purposes of the description provided herein, the following definitions are used:

Augmented reality: an immersive viewing experience in which images presented to the viewer are based on the location and/or orientation of the viewer's head and/or eyes, and are presented in conjunction with the viewer's view of actual objects in the viewer's environment.

Conventional image: an image in which the pixel values are not, collectively or individually, indicative of the angle of incidence at which light is received on the surface of the sensor.

Depth: a representation of distance between an object and/or corresponding image sample and the entrance pupil of the optics of the capture system.

Image: a two-dimensional array of pixel values, or pixels, each specifying a color.

Importance metric: an indicator of the importance of a subset of video data.

Input device: any device that receives input from a user.

Light-field camera: any camera capable of capturing light-field images.

Light-field data: data indicative of the angle of incidence at which light is received on the surface of the sensor.

Light-field image: an image that contains a representation of light-field data captured at the sensor, which may be a four-dimensional sample representing information carried by ray bundles received by a single light-field camera.

Light-field volume: the combination of all light-field images that represents, either fully or sparsely, light rays entering the physical space defined by the light-field volume.

Processor: any processing device capable of processing digital data, which may be a microprocessor, ASIC, FPGA, or other type of processing device.

Ray bundle, "ray," or "bundle": a set of light rays recorded in aggregate by a single pixel in a photosensor.

Scene: an arrangement of objects and/or people to be filmed.

Sensor, "photosensor," or "image sensor": a light detector in a camera capable of generating images based on light received by the sensor.

Stereo virtual reality: an extended form of virtual reality in which each eye is shown a different view of the virtual world, enabling stereoscopic three-dimensional perception.

Tile: a portion of a vantage video data set corresponding to a particular viewing direction.

Vantage: a position in three-dimensional space with associated video data.

Vantage video data set: the portion of video data associated with a particular vantage.

Video data: a collection of data comprising imagery and/or audio components that capture a scene.

Viewing data: data that records aspects of viewing of an experience by one or more viewers.

Viewing volume: a three-dimensional region from within which virtual views of a scene maybe generated.

Viewpoint video: imagery and/or sound comprising one or more virtual views.

Virtual reality: an immersive viewing experience in which images presented to the viewer are based on the location and/or orientation of the viewer's head and/or eyes.

Virtual view: a reconstructed view, typically for display in a virtual reality or augmented reality headset, which may be generated by resampling and/or interpolating data from a captured light-field volume.

Virtual viewpoint: the location, within a coordinate system and/or light-field volume, from which a virtual view is generated.

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present disclosure, and that the disclosure is not limited to cameras. Thus, the use of the term "camera" herein is intended to be illustrative and exemplary, but should not be considered to limit the scope of the disclosure. Specifically, any use of such term herein should be considered to refer to any suitable device for acquiring image data.

In the following description, several systems and methods for capturing video are described. One skilled in the art will recognize that these various systems and methods can be performed singly and/or in any suitable combination with one another. Further, many of the configurations and techniques described herein are applicable to conventional imaging as well as light-field imaging. Further, although the ensuing description focuses on video capture for use in virtual reality or augmented reality, the systems and methods described herein may be used in a much wider variety of video applications.

Importance Metrics

As described previously, delivery of a virtual reality or augmented reality experience may push the limits of bandwidth, storage, and/or processing capabilities of known computing and display systems. Accordingly, it is desirable to give priority, in terms of such system resources, to the content that is most desirable and/or most likely to be viewed by the viewer. This may be accomplished, in some embodiments, by assigning different importance metrics to different portions of video data for a virtual reality or augmented reality experience. The importance metrics may denote which portions are most important, and therefore should be prioritized for delivery to the viewer. One exemplary method for using such importance metrics will be shown and described in connection with FIG. 1.

Referring to FIG. 1, a flow diagram depicts a method 100 for delivering video for a virtual reality or augmented reality experience, according to one embodiment. As shown, the method 100 may start 110 with a step 120 in which video data is stored. The video data may encompass video from multiple viewpoints and/or viewing directions within a viewing volume that can be selectively delivered to the viewer based on the position and/or orientation of the viewer's head within the viewing volume, thus providing an immersive experience for the viewer.

The video data may be divided into a plurality of vantages, each of which is for one of a plurality of positions within the viewing volume. Each vantage may be divided into a plurality of tiles, each of which is for one of a plurality of possible viewing directions. Vantages and tiles will be described in greater subsequently, and are also described in the above-cited related U.S. application Ser. No. 15/590,877 for "Spatial Random Access Enabled Video System with a Three-Dimensional Viewing Volume," filed on May 9, 2017, the disclosure of which is incorporated herein by reference in its entirety.

In a step 130, importance metrics may be assigned to different portions of the video data. For example, the video data may be broken down into different regions within the viewing volume, some of which receive higher priority than others. Additionally or alternatively, the video data may be broken down into different sets of tiles, representing different viewing directions. The regions and/or sets of tiles may be determined based one or more factors, which may include, but are not limited to, the following:

The likelihood that the viewer will position his or her head in the region and/or orient his or her head along the viewing direction;

The locations of any points of interest likely to be visited by the viewer, including but not limited to featured portions of a virtual reality experience and real-life locations likely to be of interest in an augmented reality experience;

The quality of the experience as viewable from within the region and/or from along the viewing direction, which may include factors such as the visual quality of the content, the degree of parallax, the level of interactivity for augmented reality experience, and the like; and The presence or absence of additional sensory content, such as an auditory, olfactory, or tactile stimulus coordinated with the region and/or along the viewing direction.

The determination of the importance metric for any given region and/or set of tiles may be made, for example, through the use of one or more approaches including, but not limited to:

Viewing data obtained from historical viewings of the experience, indicating that viewers prefer or more frequently one region and/or set of tiles over another;

Receipt of input from a user, such as a viewer or director, setting importance metrics for one or more regions and/or tile sets; and Analysis of the video data to determine the quality and/or likelihood of viewing of a given region and/or set of tiles.

These approaches will each be described in greater detail below.

In order to capture viewing data, the movement of a viewer's head may be measured as he or she views a particular segment of the experience. Viewing position and/or direction may be tracked and logged as the viewer experiences the segment. Where the video data is divided into vantages and/or tiles, the particular vantage and/or tile being delivered to the viewer may be logged.

Less frequently viewed vantages and/or tiles may receive a lesser importance metric (an importance metric indicating they are less important than other vantages and/or tiles). Based on the lesser importance metric, these vantages and/or tiles may be compressed with lesser quality, delivered after other vantages and/or tiles, processed after other vantages and/or tiles, omitted from the experience altogether, and/or otherwise de-prioritized in the delivery of the experience.

If desired, the actions of the same and/or different viewers may be measured across time and/or across multiple viewings to determine behavior. It is likely that a viewer will look at different places on their second or third viewing of the same content. Viewing statistics, such as vantage and/or tile viewing statistics, may be gathered offline and/or online to inform the compression algorithm and/or other modules that control the capture, storage, delivery, and/or processing of the experience.

Some viewers may have a special preference for a particular actor, athlete, or other performer in a sports broadcast, movie, concert, or other event. Compression quality and/or other delivery parameters may be set for the viewer based on his or her preferences. This may be done automatically by observing the viewing actions taken by the viewer.

In the alternative, explicit input may be received from the viewer to indicate such preferences. For example, the viewer may select particular performers, particular types of scenes, particular portions of an experience, and/or other aspects of an experience to be prioritized or de-prioritized for viewing.

In some examples, the viewer may explicitly select regions of the experience to be prioritized. A testing method such as A/B testing may be used to determine which resource allocation parameters provide the best experience for the viewer.

According to still other embodiments, a content producer or other person involved with the generation of the experience may provide input to explicitly assign importance metrics. For example, a director may indicate the most optimal or intended viewing experience and assign higher importance metrics to those vantage tile paths. This may be used to drive the viewer to the path chosen by the director.

Thus, importance metrics may be used to subtly encourage viewers to view the content as indicated by the director.

In some embodiments, importance metrics may be assigned based on the presence or absence of additional sensory content. Such additional sensory content may include, but is not limited to, sounds, smells, tactile content such as haptic feedback or other vibrations, and the like. Such sensory content may be timed to coincide with a key portion of the video data, which may have a high likelihood of being viewed by a viewer, or may desirably be rendered with higher quality. Such sensory content may further provide an impulse to the viewer to look in a particular direction, strengthening the likelihood that the associated video data will be viewed by the viewer.

As another alternative, the video data may be analyzed, for example, by a computing device, to automatically set importance metrics. The importance metrics may be calculated using one or more objective measures. Such objective measures may be computed using attributes such as, but not limited to, the following:

- Pixel coverage of the three-dimensional scene, for example, as in Vázquez, P. P., Feixas, M., Sbert, M. and Heidrich, W. (2003), Automatic View Selection Using Viewpoint Entropy and its Application to Image-Based Modelling. *Computer Graphics Forum*, 22: 689-300. doi:10.1111/j.1467-8659.2003.00717.x;
- Quality metrics, such as PSNR, SSIM, for example, as in Wang, Zhou, et al. "Image quality assessment: from error visibility to structural similarity." *IEEE transactions on image processing* 13.4 (2004): 200-612, AQM, for example, as in Myszkowski, Karol, Przemyslaw Rokita, and Takehiro Tawara. "Perception-based fast rendering and antialiasing of walkthrough sequences." *IEEE Transactions on Visualization and Computer Graphics* 6.4 (2000): 360-379, and absolute differences;
- Saliency, for example, as in Itti, Laurent, Christof Koch, and Ernst Niebur. "A model of saliency-based visual attention for rapid scene analysis." *IEEE Transactions on pattern analysis and machine intelligence* 20.11 (1998): 1254-1259 or Lee, Chang Ha, Amitabh Varshney, and David W. Jacobs. "Mesh saliency."*ACM transactions on graphics (TOG)*. Vol. 24. No. 3. ACM, 2005;
- Contrast sensitivity analysis, for example, as in Robson, J. G. "Spatial and temporal contrast-sensitivity functions of the visual system." *Josa* 56.8 (1966): 1141-1142;
- Image entropy; and
- Motion.

The importance metric may be calculated in a wide variety of ways, through the use of data obtained from any of the foregoing methods. Such methods may be carried out across the vantages of the video data by comparing vantages with each other, and/or across the tiles of one or more vantage by comparing the tiles of each vantage with each other. For example, for a given tile, the importance metric may be calculated as the change in quality measure when resource allocation parameters of the given tile are changed. One can also formulate the resource allocation as an optimization problem with the importance metrics as the objective function and the resource allocation parameters as the input parameters, constraining by available system resources. Such optimization may be carried out as set forth in Everett III, Hugh. "Generalized Lagrange multiplier method for solving problems of optimum allocation of resources." *Operations research* 11.3 (1963): 399-417.

Importance metrics may be in any of a variety of forms, including but not limited to:
- Numeric scores such as one through ten, which may be rounded to the nearest integer or expressed as a floating point number;
- Importance categories such as least important, moderately important, and most important; and
- Letter scores, such as a, b, c, and d.

Importance metrics may assign vantages and/or tiles to two categories such as "more important" and "less important." Alternatively, more than two distinct importance metrics may be assignable to provide a broader spectrum of importance levels. Importance metrics may be stored in association with the video data, for example, in metadata stored in files of the video data.

In some embodiments, the step 130 may be carried out prior to the step 120, and the step 120 may then be carried out with reference to the importance metrics of the video data. For example, some or all of the video data may be compressed, and the compression used for vide data with a high importance metric may be different from that of the video data with a low importance metric. Specifically, the video data with a higher importance metric may be encoded and/or compressed in a manner that provides higher quality, faster retrieval, faster processing, and/or the like, by comparison with the video data with a lower importance metric.

Additionally or alternatively, the video data may be captured in a manner that references the importance metrics. For example, more video data may be captured proximate locations of interest in the immersive experience, or the video data captured may be captured at higher quality at those locations. This may enhance the quality of the video data that is available for generation of virtual viewpoints proximate the locations of interest.

Once the importance metrics have been assigned to the video data, the virtual reality or augmented reality experience may be initiated. In a step 140, viewpoint data may be received to indicate the position and/or orientation of the viewer's head, indicating the viewer's actual viewpoint. The actual viewpoint may be converted into a virtual viewpoint within the viewing volume of the video data.

In a step 150, a subset of the video data may be retrieved. The subset may be selected to include all of the video data likely to be needed to render a virtual view of the scene captured by the video data, from the virtual viewpoint corresponding to the viewpoint data received in the step 140. The contents of the subset may be determined based, in part, on the importance metrics; video data corresponding to particular vantages and/or tiles may optionally be excluded from the subset if the importance metric for those vantages and/or tiles is below a threshold. Additionally or alternatively, the order in which the video data within the subset is retrieved may be determined based on the importance metrics, with the video data within the subset having lower importance metrics retrieved after that having higher importance metrics.

In a step 160, the subset of the video data retrieved in the step 150 may be used to generate viewpoint video data, representing a view of the scene from the viewer's viewpoint. Generation of the viewpoint video may also be carried out with reference to the importance metrics. For example, decompression of the portion of the subset having a higher importance metric may be carried out before and/or with higher quality than decompression of the portion of the subset having a lower importance metric. Additionally or alternatively, the portion of the subset with a higher importance metric may be rendered for viewing before and/or with higher quality than rendering of the portion of the subset having a lower importance metric.

In a step 170, the viewpoint video may be displayed for the viewer on a display device. In some embodiments, the display device may be part of a virtual reality or augmented reality headset. The viewpoint video may include sound, which may be played for the viewer via an output device such as one or more speakers or headphones. As indicated previously, the experience may additional sensory content such as sounds, smells, tactile content, and the like. If desired, virtual reality or augmented reality equipment may include other output devices, such as vibration or scent-producing elements, that provide such additional sensory content.

Pursuant to a query 180, a determination may be made as to whether the experience has been completed. If not, the method 100 may return to the step 140, in which the viewpoint data may again be captured to obtain the position and/or orientation for a new virtual viewpoint from which the scene is to be rendered for display for the viewer. The step 140, the step 150, the step 160, and the step 170 may be repeated until the query 180 is answered in the affirmative, representing that the experience is complete. The method 100 may then end 190.

The steps of the method 100 may be reordered, omitted, replaced with alternative steps, and/or supplemented with additional steps not specifically described herein. The steps set forth above will be described in greater detail subsequently in the discussion of vantages and tiles.

Virtual Reality Display

Figure 2:
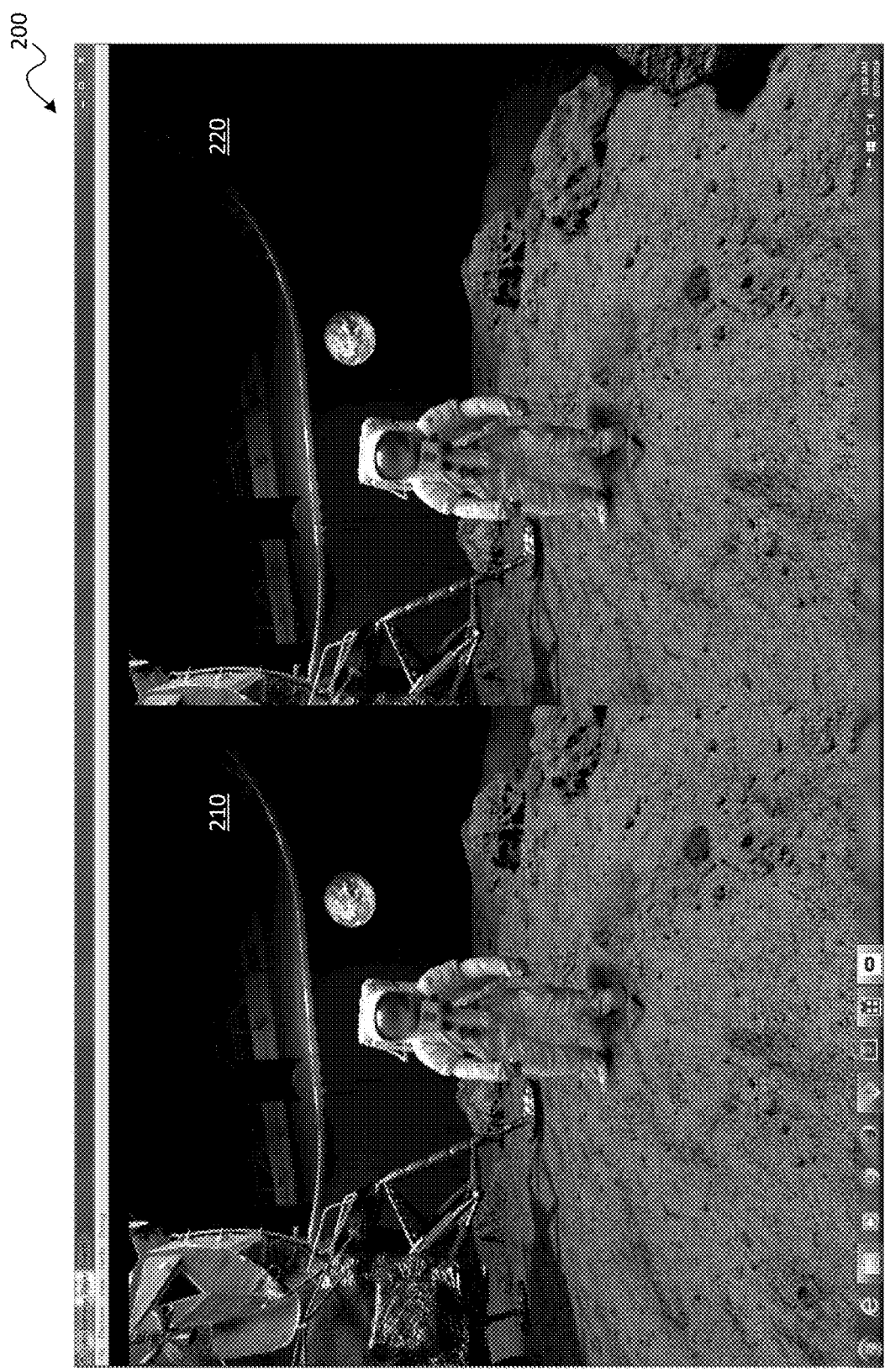
FIG. 2 is a screenshot diagram depicting a frame from a viewpoint video of a virtual reality experience, according to one embodiment.

Referring to FIG. 2, a screenshot diagram 200 depicts a frame from a viewpoint video of a virtual reality experience, according to one embodiment. As shown, the screenshot diagram 200 depicts a left headset view 210, which may be displayed for the viewer's left eye, and a right headset view 220, which may be displayed for the viewer's right eye. The differences between the left headset view 210 and the right headset view 220 may provide a sense of depth, enhancing the viewer's perception of immersion in the scene.

Vantages

As indicated previously, the video data for a virtual reality or augmented reality experience may be divided into a plurality of vantages, each of which represents the view from one location in the viewing volume. More specifically, a vantage is a view of a scene from a single point in three-dimensional space. A vantage can have any desired field-of-view (e.g. 90° horizontal×90° vertical, or 360° horizontal×180° vertical) and pixel resolution. A viewing volume may be populated with vantages in three-dimensional space at some density.

Based on the position of the viewer's head, which may be determined by measuring the position of the headset worn by the viewer, the system may interpolate from a set of vantages to render the viewpoint video in the form of the final left and right eye view, such as the left headset view 210 and the right headset view 220 of FIG. 2. A vantage may contain extra data such as depth maps, edge information, and/or the like to assist in interpolation of the vantage data to generate the viewpoint video.

The vantage density may be uniform throughout the viewing volume, or may be non-uniform. A non-uniform vantage density may enable the density of vantages in any region of the viewing volume to be determined based on the likelihood the associated content will be viewed, the quality of the associated content, and/or the like. Thus, if desired, importance metrics may be used to establish vantage density for any given region of a viewing volume.

Figure 3:
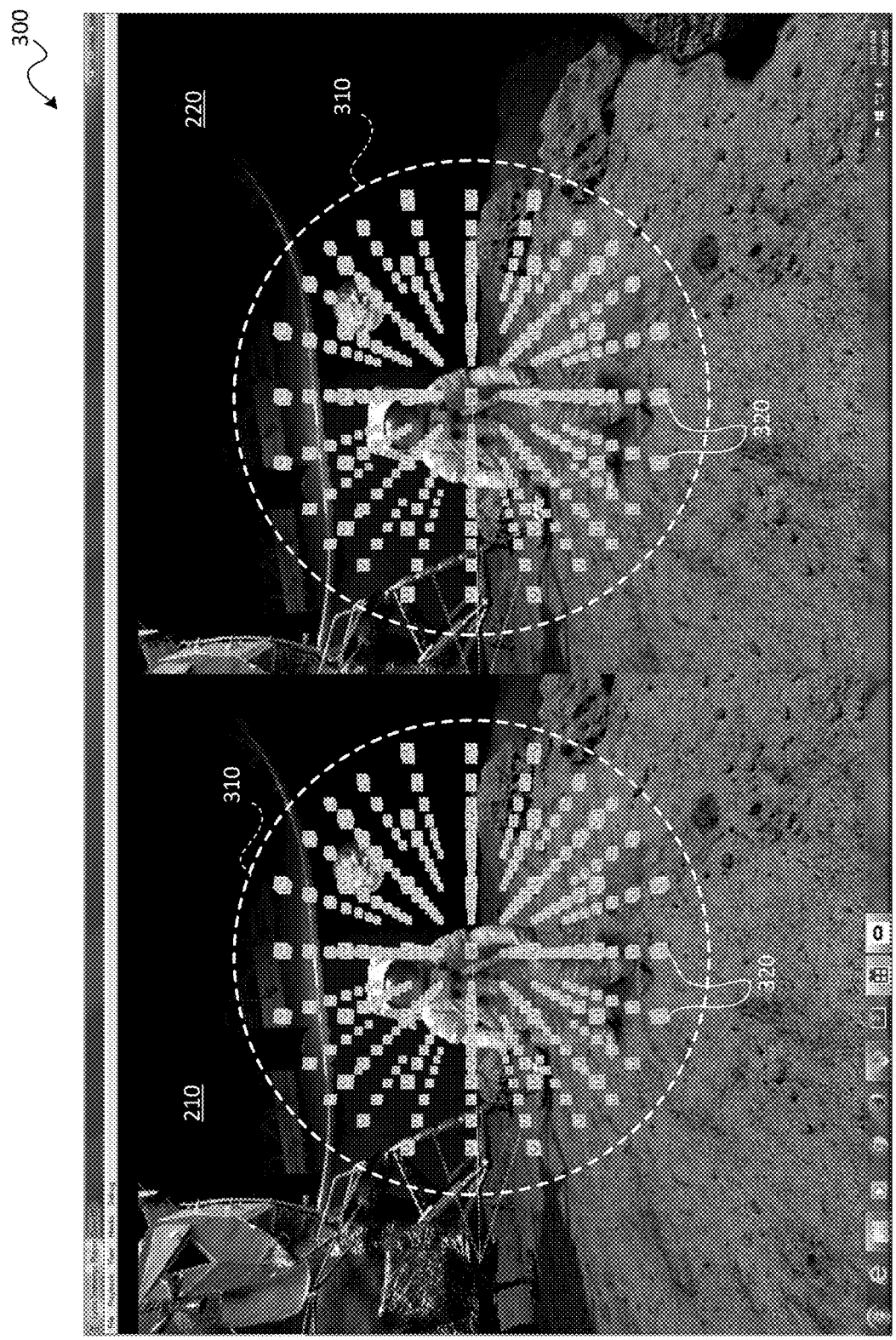
FIG. 3 is a screenshot diagram depicting the screenshot diagram of FIG. 2, overlaid with a viewing volume for each of the eyes, according to one embodiment.

Referring to FIG. 3, a screenshot diagram 300 depicts the screenshot diagram 200 of FIG. 2, overlaid with a viewing volume 310 for each of the eyes, according to one embodiment. Each viewing volume 310 may contain a plurality of vantages 320, each of which defines a point in three-dimensional space from which the scene may be viewed by the viewer. Viewing from between the vantages 320 may also be carried out by combining and/or extrapolating data from vantages 320 adjacent to the viewpoint.

Figure 4:
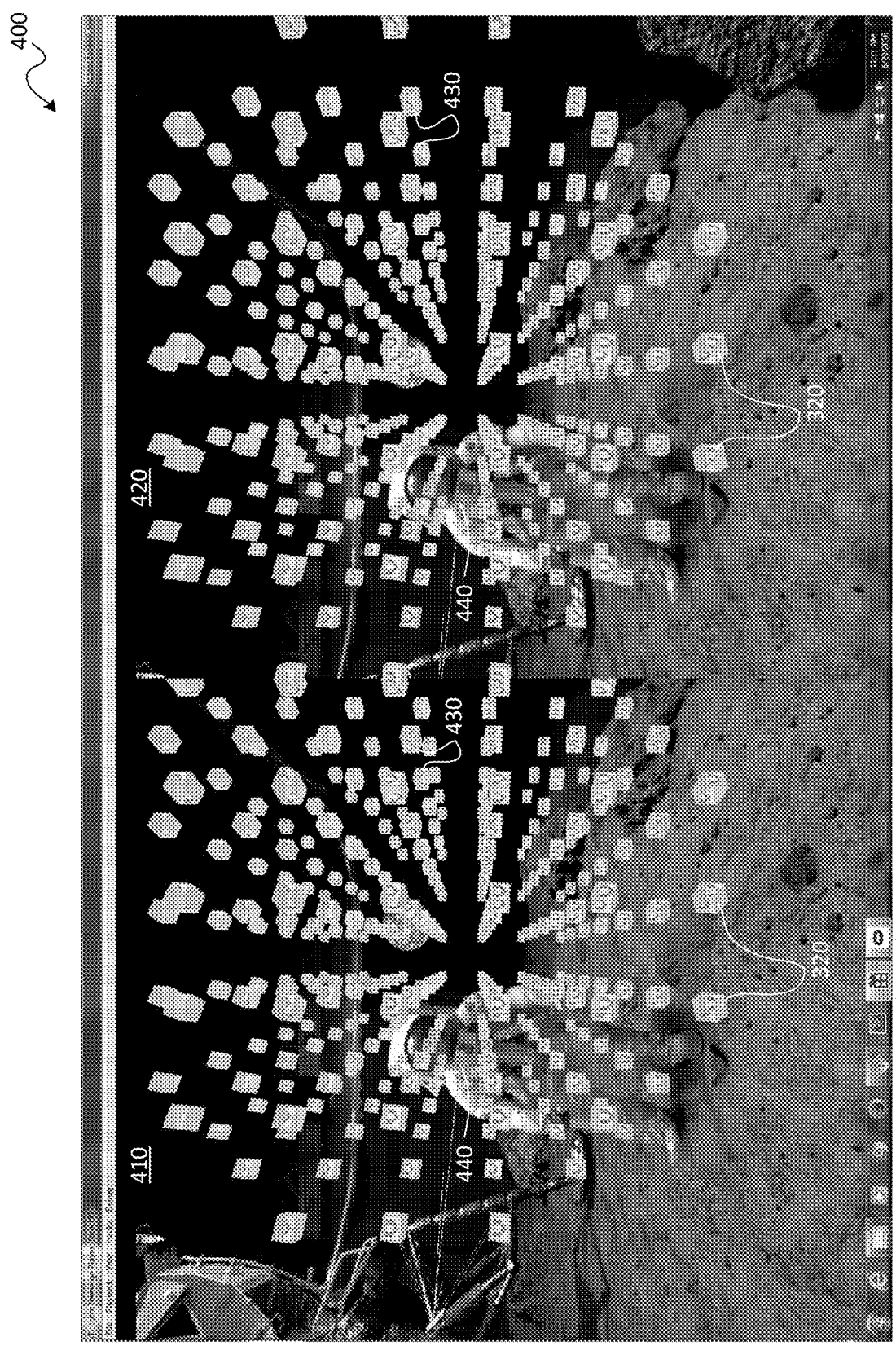
FIG. 4 is a screenshot diagram depicting the view after the headset has been moved forward, toward the scene of FIG. 2, according to one embodiment.

Referring to FIG. 4, a screenshot diagram 400 depicts the view after the headset has been moved forward, toward the scene of FIG. 2, according to one embodiment. Again, a left headset view 410 and a right headset view 420 are shown, with the vantages 320 of FIG. 3 superimposed. Further, for each eye, currently and previously traversed vantages 430 are highlighted, as well as the current viewing direction 440.

Tiles

Figure 5:
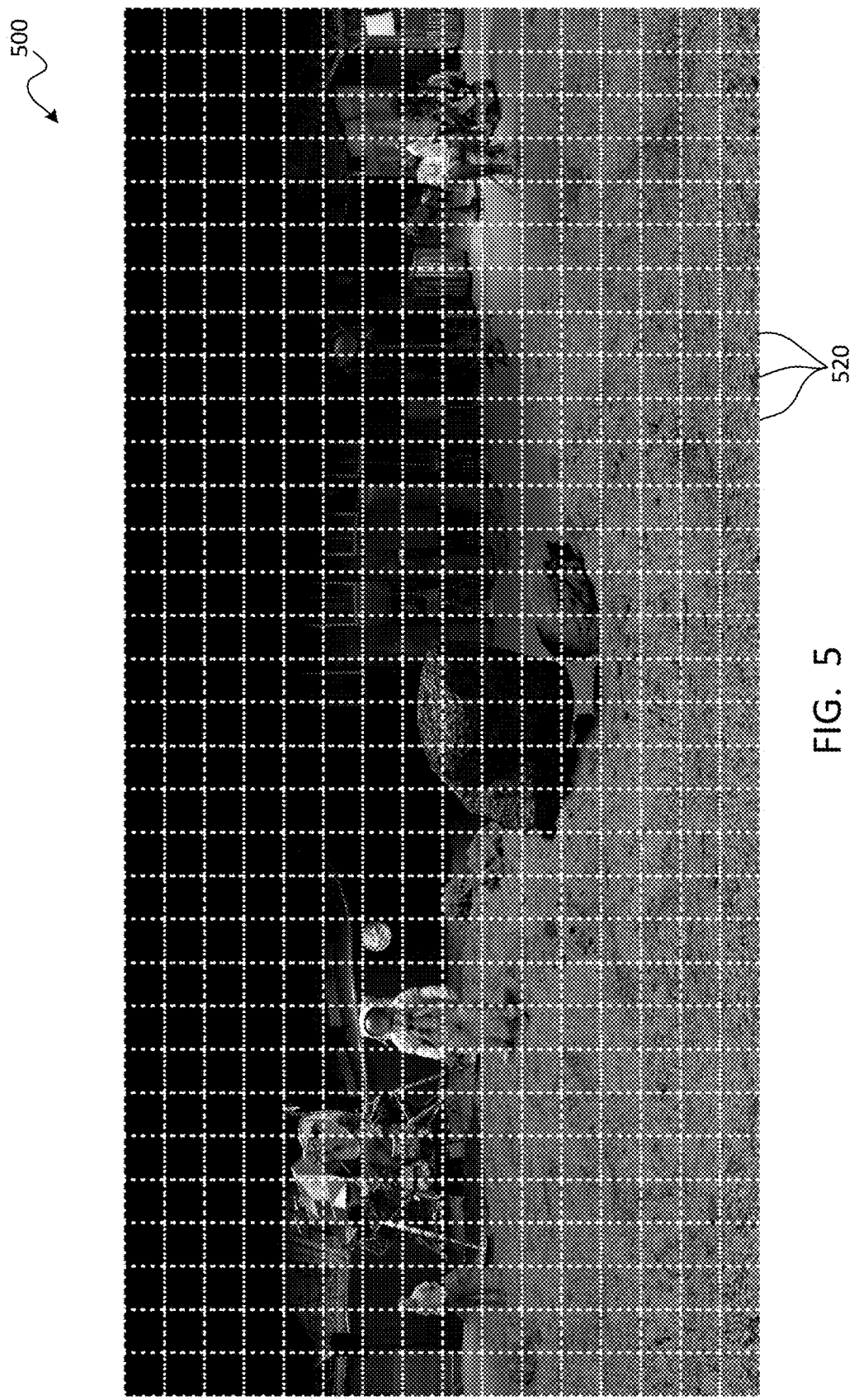
FIG. 5 is a screenshot diagram depicting the color channel from a single vantage, such as one of the vantages of FIG. 3, according to one embodiment.

Referring to FIG. 5, a screenshot diagram 500 depicts the color channel from a single vantage, such as one of the vantages 320 of FIG. 3, according to one embodiment. As shown, each vantage 320 may have a wide angle field-of-view of the scene, encompassing many possible viewing directions. For a full 360° horizontal×180° vertical vantage, the viewer is only looking at a certain portion of vantage at any given time. The portion may be defined by the headset's field-of-view for each eye.

To be efficient for rendering performance, data input/output performance, and/or data compression/decompression, vantages may be tiled into smaller areas. Uniformly-sized rectangular tiles may be used in some embodiments. For example, as depicted in FIG. 5, the color channel for one of the vantages 320 may be divided into a rectangular grid of tiles 520, with thirty-two columns of tiles, and sixteen rows of tiles. This is merely exemplary, as different numbers of tiles may be used, such as sixteen columns by eight rows. The tiles 520 are also depicted in rectilinear space, but may, in alternative embodiments, be defined in the latitudinal/longitudinal space defined by wrapping the screenshot diagram 500 around a sphere.

Figure 12:
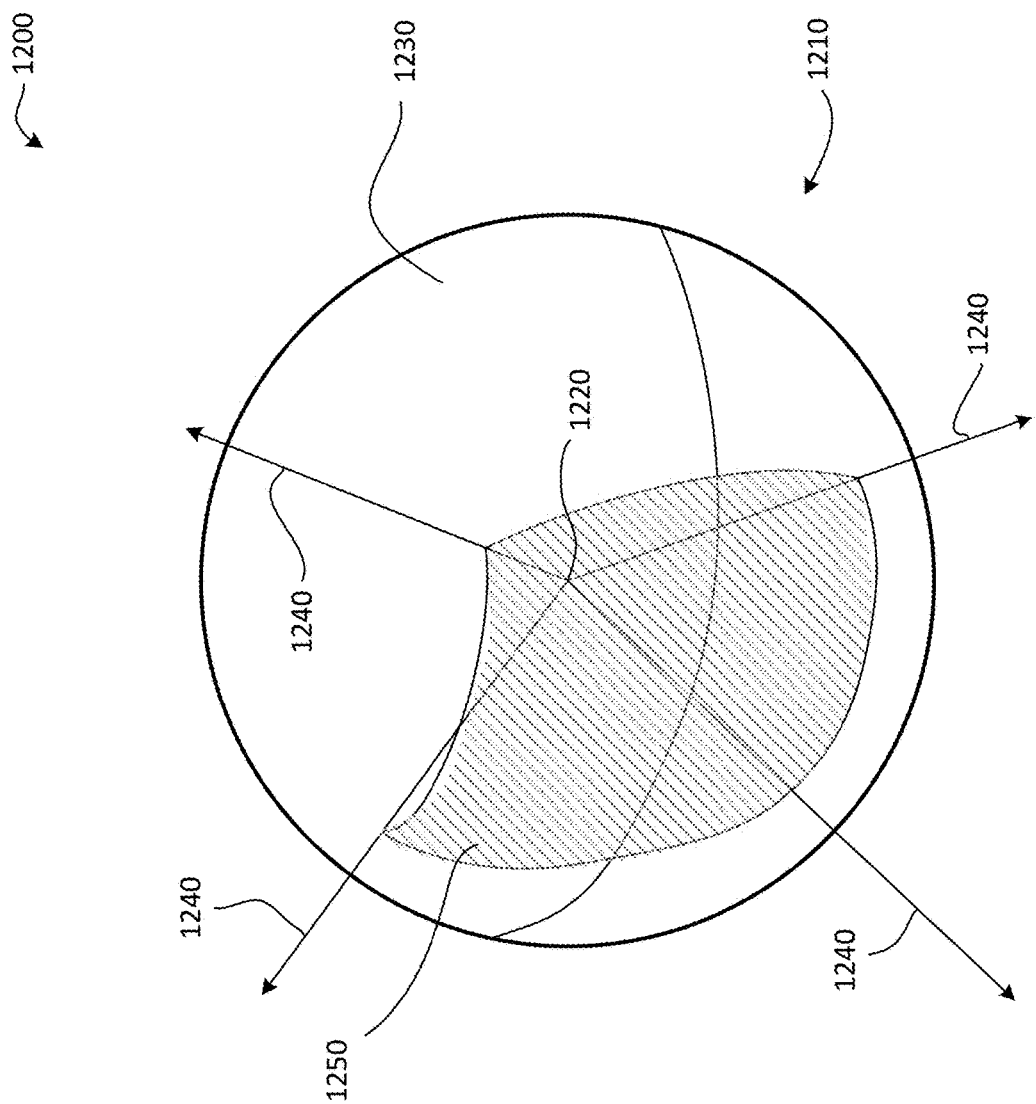
FIG. 12 is a diagram depicting a vantage, according to one embodiment.

Referring to FIG. 12, a diagram 1200 depicts a vantage 1210 according to one embodiment. The vantage 1210 may have a center 1220 and image data, such as an RGB channel and/or a depth channel, which may define a sphere 1230 encircling the center 1220. A field-of-view may be represented by four vectors 1240 extending outward from the center 1220 to pass through the surface of the sphere 1230. A semispherical area 1250 (shown in red hatching) on the surface of the sphere 1230, between the locations at which the vectors 1240 pass through the surface of the sphere 1230, may represent the portion of the RGB channel of the vantage 1210 that is to be viewed currently and/or used in combination with other vantage data to generate viewpoint video.

Figure 6:
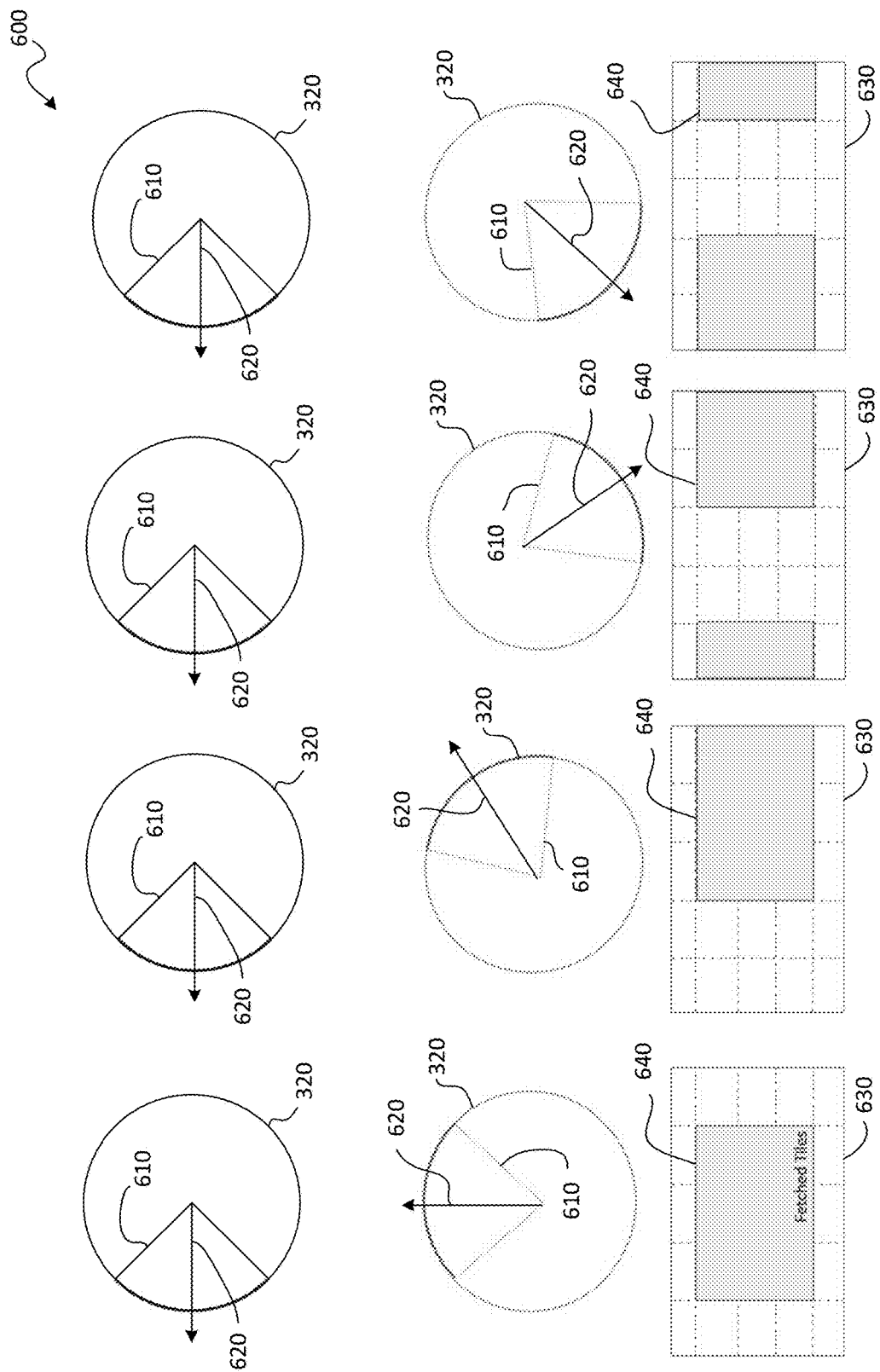
FIG. 6 is a diagram depicting the manner in which the tiles of a vantage, such as one of the vantages of FIG. 3, may be selected, according to one embodiment.

Referring to FIG. 6, a diagram 600 depicts the manner in which the tiles of a vantage, such as one of the vantages 320 of FIG. 3, may be selected, according to one embodiment. The vantages 320 have any of a wide variety of shapes, including but not limited to spherical and cylindrical shapes. The diagram 600 depicts vantages 320 as having spherical shapes, by way of example.

The top row depicts four side views of a sphere representing the vantage 320. A field-of-view 610 is oriented along the viewing direction 620 currently being viewed by the viewer. The field-of-view 610 is depicted in the same orientation in each view of the top row because the field-of-view 610 is depicted, in each case, from its left side. The middle row depicts four top views of the sphere representing the vantage 320, depicting the field-of-view 610 in various orientations.

The bottom row depicts the color channel 630 for the vantage 320, divided into tiles as in FIG. 5. A subset 640 of the tiles of the color channel 630 may be fetched to correspond to the viewer's viewpoint, permitting the viewpoint video to be rendered. The subset 640 may move, for example, to the right, within the color channel 630, as the viewer pivots his or her head to the right, as can be seen by viewing the first row, then the second row, then the third row, and then the fourth row of FIG. 6. Tiles may also be fetched from other vantages proximate the viewers viewpoint and combined with the subset 640 to render the viewpoint video.

In alternative embodiments, non-uniformly sized and/or non-rectangular tiles may be used. The sizes and/or shapes of the tiles may be dependent on the content depicted in those tiles. For example, more tiles may be positioned areas of vantages with higher importance metrics than the surrounding areas, enabling the more important viewing directions to be rendered in greater detail.

Depth Channel

Figure 7:
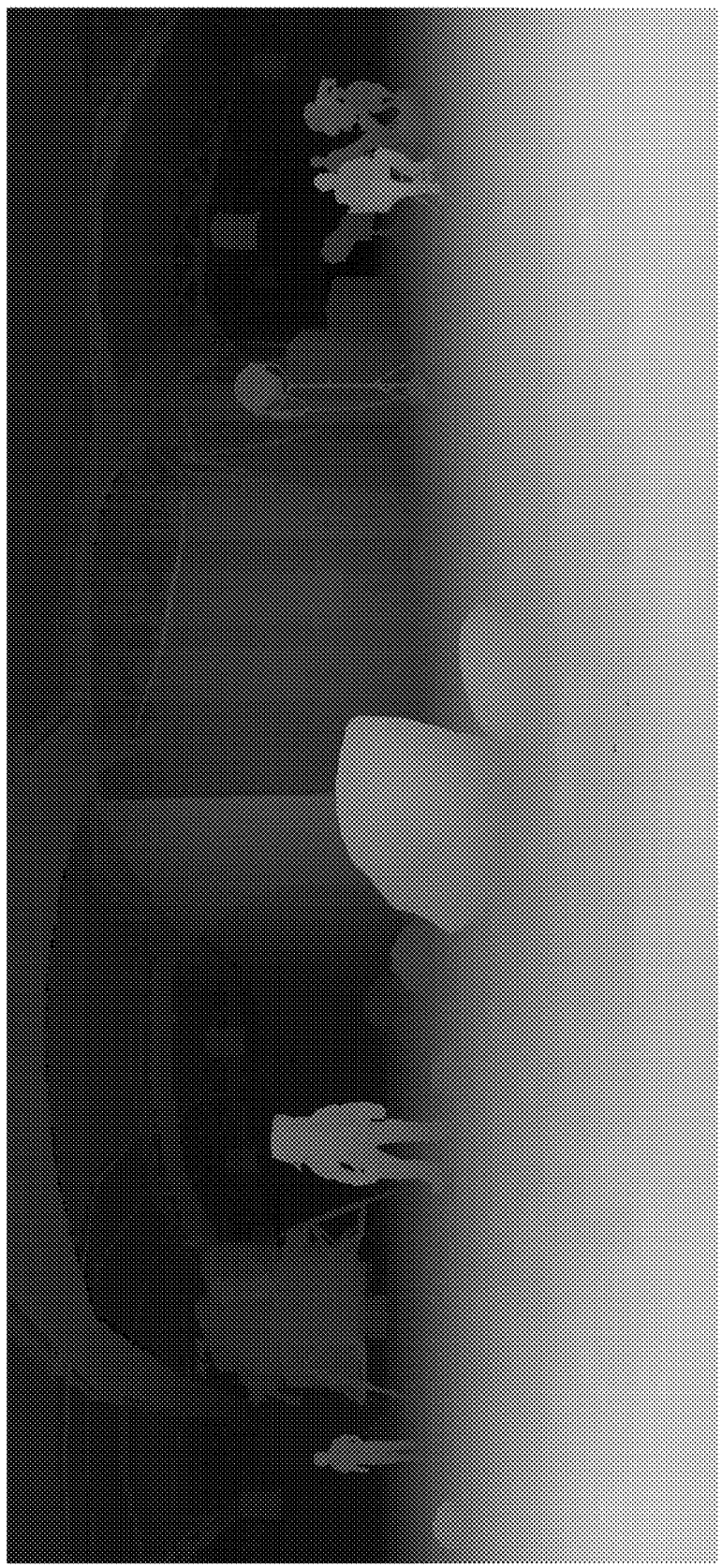
FIG. 7 is a screenshot diagram depicting the depth channel from the vantage used to provide the screenshot diagram of FIG. 5, according to one embodiment.

Referring to FIG. 7, a screenshot diagram 700 depicts the depth channel from the vantage used to provide the screenshot diagram 500 of FIG. 5, according to one embodiment. Depth information may be encoded into each vantage to provide proper parallax and/or other visual effects.

Vantage-Based and Tile-Based Usage of Importance Metrics

As indicated previously, vantages, such as the vantages 320 of FIG. 3, may have different importance metrics to indicate the relative importance of the vantages 320. Further, tiles, such as the tiles 520 of FIG. 5, can have different importance metrics indicating the relative importance of the tiles. The importance metrics may be used in a variety of ways to prioritize and/or enhance delivery of more important content to the viewer.

In some embodiments, the importance metrics may be used to guide the compression algorithms to allocate more bits/quality to the more important portions and less bits/quality to the less important portions of the viewpoint provided by a vantage 320. As each of the tiles 520 represents a direction into the scene as well as a position in space, importance levels of tiles may vary along either or both of the X and Y axes.

Such importance metrics may guide a vantage-based video system in the allocation of resources such as, but not limited to, the number of vantages, vantage density, vantage placement, bits and encoding/decoding complexity, in order to meet system constraints, such as bandwidth, storage, CPU resources, and/or GPU resources.

For example, to maximize perceived quality, the system can allocate more resources to more important regions of the viewing volume and/or more important tiles than less important regions and/or tiles. If a limit on the maximal number of vantage must be adhered to in order to meet system requirements, the importance metrics may be used to determine the optimal location of the vantages. Thus, importance metrics may be used to place vantages or tiles in the video data in the step 120 of the method 100 of FIG. 1.

The importance metric for vantage tiles may be applied to caching strategy for playback, for example, on a personal computer or mobile device. In such applications, where disk input/output and/or network streaming bandwidth may be constrained, it may be desirable to pre-fetch the most important vantage tiles ahead of time. Any number of known predictive caching techniques may be used to accomplish this. The importance metrics may be referenced to prioritize more important video data for predictive caching.

A system can utilize an importance map to allocate system resources for capturing, encoding, decoding, storing, pre-processing, post-processing, delivering, and/or playing content. The parameters used for resource allocation may include, but are not limited to the following, and may be applied to each individual tile or vantage, a subset of tiles or vantages and/or globally:

The number of vantages in the viewing volume and/or a region of the viewing volume;
Vantage density in the viewing volume and/or a region of the viewing volume;
The position of vantages relative to content;
The location of vantages;
The number, complexity, and location of view-dependent variations, such as variations in lighting and resolution;
The spatial resolution of tiles;
The temporal resolution of tiles;
The color/depth bit-sampling of tiles;
The bitrate of tiles;
The quality and/or rate of rendering;
The number of vantages used for generating a viewpoint;
The density of meshes, for example, for rendered three-dimensional models;
The density of cameras used to capture the scene;
The manner in which various portions of the video data are prioritized (which portions of the video data to process, store, render, and/or transmit when resources are constrained);
The extent of pre-processing to be carried out for various portions of the video data; and
Other codec-related parameters used for encoding/decoding image data.

Those of skill in the art will recognize that the list set forth above is merely exemplary. The parameters listed above may be modified singly or in combination with each other. In other embodiments, other system resource parameters may be modified based on the importance metrics of the corresponding video data.

Vantage Density and Position

The density with which vantages are arranged (uniformly or non-uniformly) within a viewing volume, or a region of a viewing volume, may be an important resource allocation parameter. Based on how important a particular vantage and/or tile is, more vantages can be allocated to that region of the viewing volume. Optimal positions may be found to cover disocclusions that may be very content-dependent and/or scene-dependent. Parallax and view-dependent lighting may be taken into account in the assignment of importance metrics, since having the correct vantage density and position may greatly enhance provision of parallax and view dependent lighting.

Figure 8:
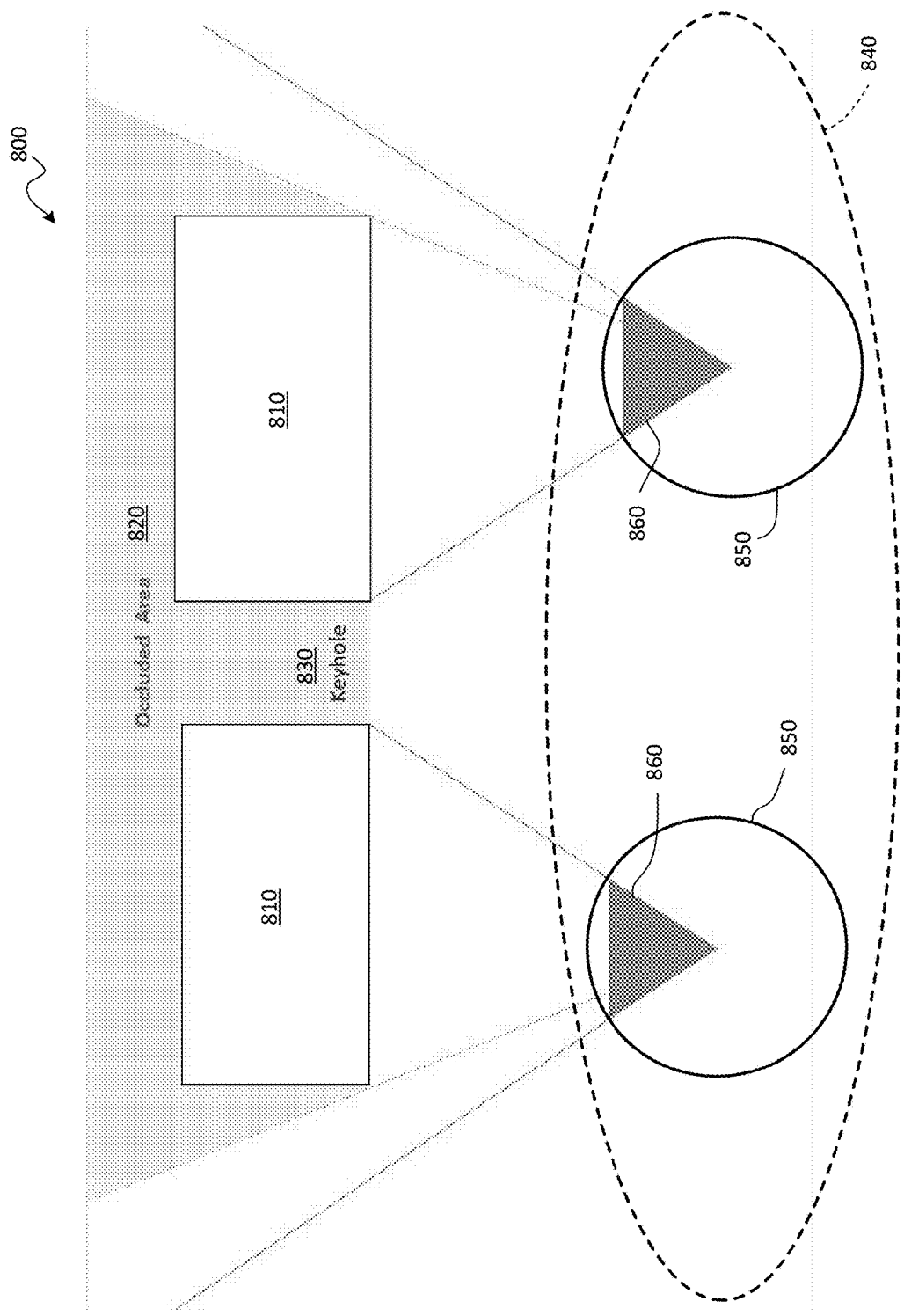
FIG. 8 is a diagram depicting a portion of a scene in which two objects are positioned such that an occluded area exists behind the objects, according to one embodiment.

Referring to FIG. 8, a diagram 800 depicts a portion of a scene in which two objects 810 are positioned such that an occluded area 820 exists behind the objects 810, according to one embodiment. A keyhole 830 may exist between the objects 810, through which the occluded area 820 may be viewable from a viewing volume 840. A plurality of vantages 850 with a viewing volume 840 are positioned proximate the objects 810. The vantages 850 may be cylindrical or spherical vantages, or may have any other shape, as discussed in connection with FIG. 6.

None of the vantages 850 within the viewing volume 840 are aligned with the keyhole 830, as shown by the fields-of-view 860 centered at the vantages 850 and oriented toward the objects 810. Accordingly, the corresponding video data may not contain accurate imagery depicting the occluded area 820. A viewer positioning his or head between the vantages 850 in an attempt to view the occluded area 820 may view viewpoint video that lacks detail regarding the occluded area 820 because the viewpoint video may be generated based on the tiles from the vantages 850; none of these tiles effectively depicts the occluded area 820.

Figure 9:
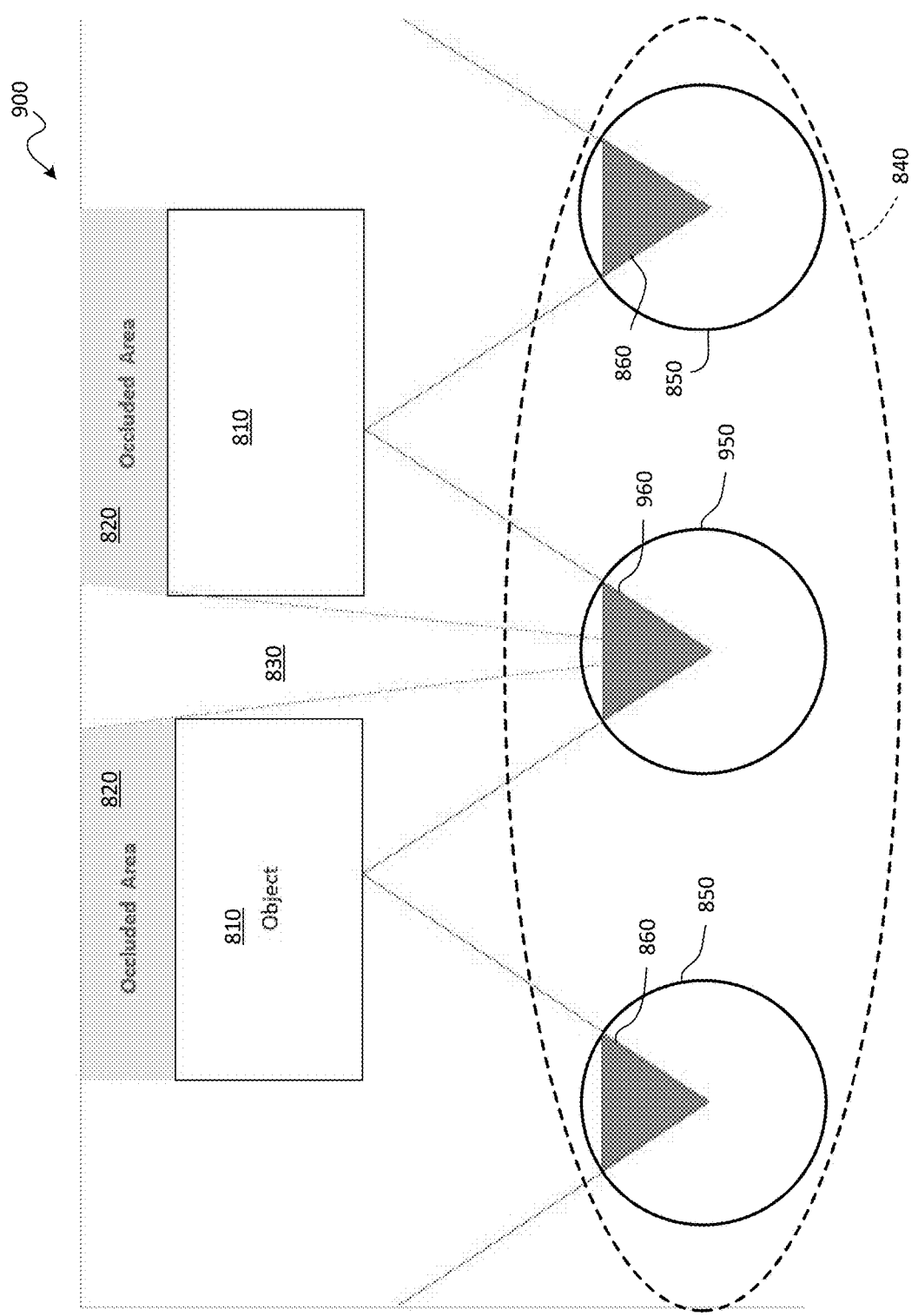
FIG. 9 is a diagram depicting the portion of the scene of FIG. 9, in which another vantage has been added to enhance viewing of the occluded area, according to one embodiment.

Referring to FIG. 9, a diagram 900 depicts the portion of the scene of FIG. 9, in which another vantage 950 has been added to enhance viewing of the occluded area 820, according to one embodiment. A field-of-view 960 from the vantage 950, oriented toward the keyhole 830, enables the viewer to view a portion of the occluded area 820.

This illustration of keyhole disocclusion depicts one manner in which vantage density and/or placement may help to determine the quality of the viewing experience. Each additional vantage adds to the quantity of video data that needs to be stored, retrieved, and/or processed; accordingly, it is beneficial to conserve system resources by using a smaller vantage density for less important portions of the video data.

One method of optimizing vantage density and position is for content creators to place vantages manually and adjust them based on quick feedback. A fixed vantage density may initially be used, and the output may be viewed in a virtual reality headset. Then, the vantages may be manually moved and adjusted vantages, either singly or in groups, until the final output quality is satisfactory. This process may be repeated for each frame in time.

To save editing time, the content creator may "pin" a set of vantages to a particular region of the viewing volume. Optical flow methods and/or the like may be applied to track these regions over time to provide the content creators with a better starting set of vantage positions. This may reduce the amount of editing that needs to be done.

Another method is to place the vantages automatically using a software algorithm that analyzes the scene and generates the optimal vantage density and/or position for the final output. In some embodiments, a mixture of the two methods (manual and automated vantage placement) may be carried out. For example, the automated method may generate a starting vantage placement for each frame. The content creator may make further adjustments in each frame, if necessary.

Viewing Data

As mentioned above, viewing data may be collected and used to set importance metrics. The viewing data may come from viewing by the content creator to set vantage densities and/or positions, as set forth in the preceding section. Alternatively, the viewing data may come from other viewers (such as consumers who are unaffiliated with the content creator) who view the experience subsequent to its creation, as described in the description of FIG. 1. The viewing data may be used not just to set vantage position and/or density, but also to set any of the system resource parameters listed previously.

Figure 10:
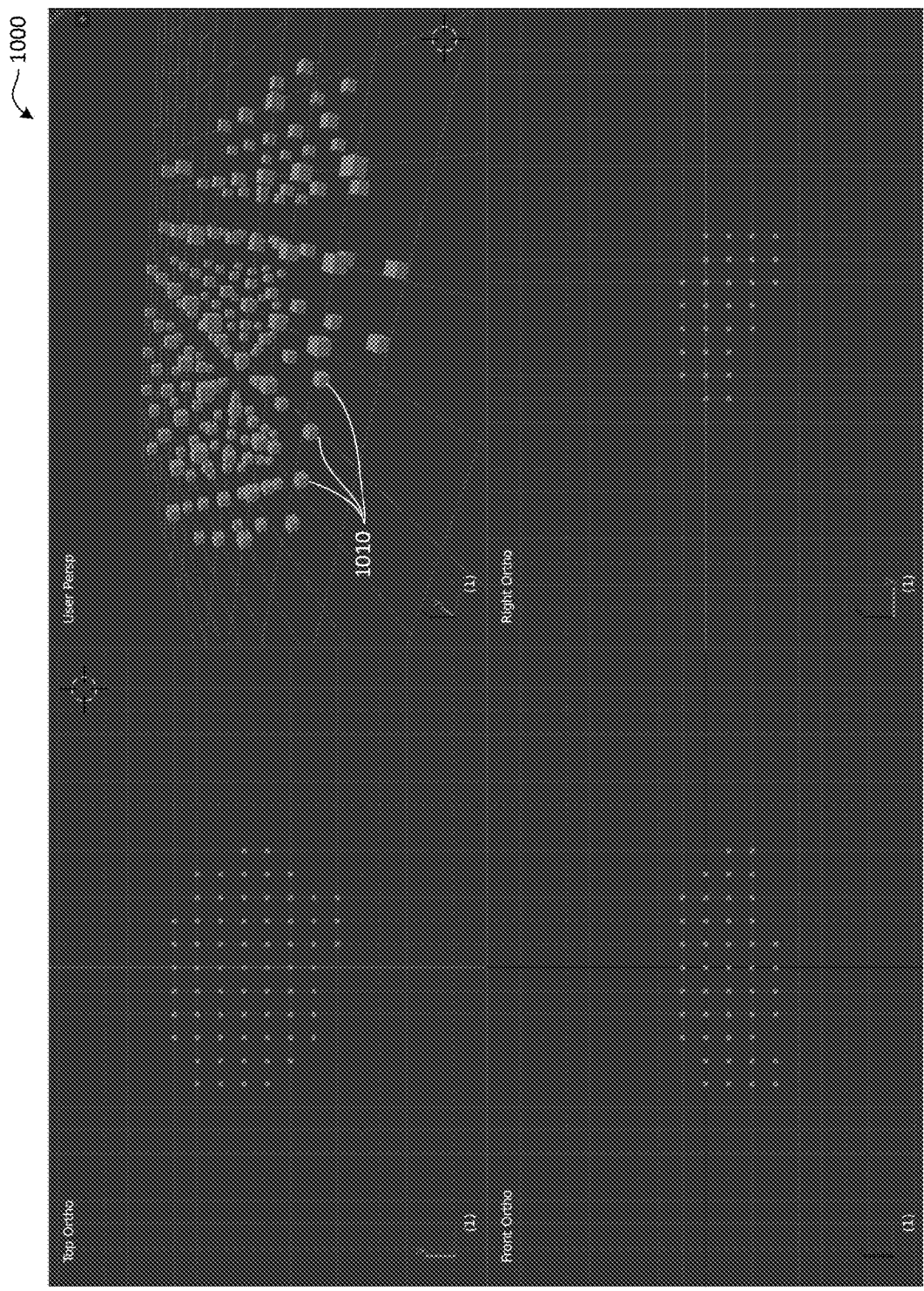
FIG. 10 is a screenshot diagram depicting the vantages traversed by a single viewer and accumulated over time, according to one embodiment.

Referring to FIG. 10, a screenshot diagram 1000 depicts the vantages 1010 traversed by a single viewer and accumulated over time, according to one embodiment. The vantages 1010 traversed by the viewer may be assigned higher importance metrics, relative to the importance metrics assigned to vantages that the viewer did not traverse.

In some embodiments, other aspects of viewing data may be recorded in connection with the information presented in FIG. 10. For example, the number of times a vantage was traversed by the viewer, the amount of time the viewer spent traversing each vantage, and/or viewing data for particular tiles of the vantages 1010 may be recorded and factored into the importance metrics to be assigned.

In some embodiments, more explicit viewer feedback may also be received and recorded. For example, a viewer may fill out a survey indicating which aspects of the virtual reality or augmented reality experience were the most enjoyable. Additionally or alternatively, biometric data (such as pulse rate, blood pressure, brain activity, etc.) may be tracked to glean information regarding the viewer's level of engagement with each portion of the experience.

In some examples, viewing data from multiple viewers may be recorded and aggregated to assign importance metrics. One such example will be shown and described in connection with FIG. 11.

Figure 11:
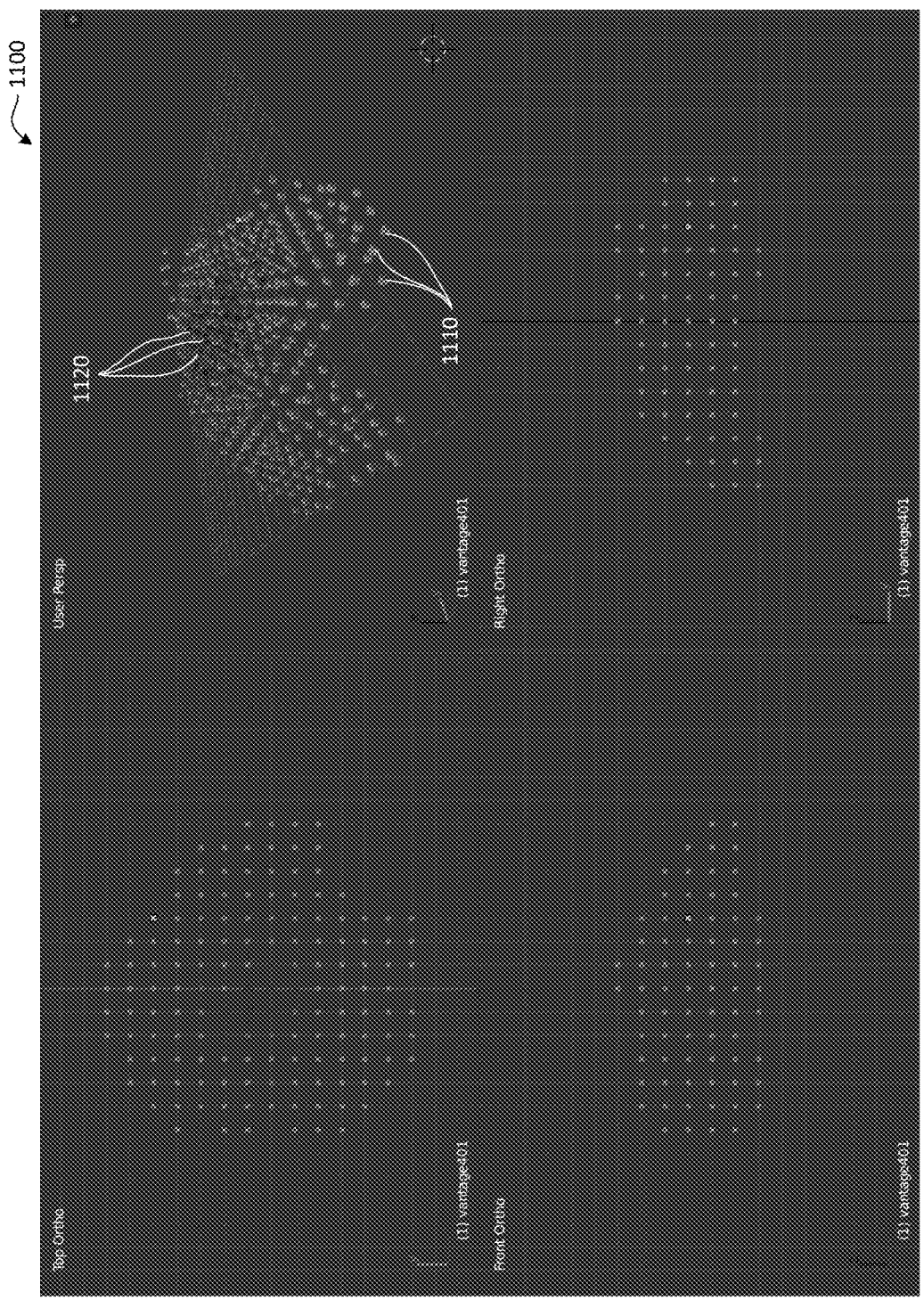
FIG. 11 is a screenshot diagram depicting the vantages traversed by multiple viewers and accumulated over time, according to one embodiment.

Referring to FIG. 11, a screenshot diagram 1100 depicts the vantages 1110 traversed by multiple viewers and accumulated over time, according to one embodiment. Vantages 1120 that have been viewed more frequently and/or for longer periods of time may be shown in a darker color, thereby presenting vantage viewing in the form of a "heat map." This may be extended in time so that changes over time in the volume and/or "heat" of the heat map may be visualized. Such information may be used to facilitate assignment of the importance metrics.

The above description and referenced drawings set forth particular details with respect to possible embodiments. Those of skill in the art will appreciate that the techniques described herein may be practiced in other embodiments. First, the particular naming of the components, capitalization of terms, the attributes, data structures, or any other programming or structural aspect is not mandatory or significant, and the mechanisms that implement the techniques described herein may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

Some embodiments may include a system or a method for performing the above-described techniques, either singly or in any combination. Other embodiments may include a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions of described herein can be embodied in software, firmware and/or hardware, and when embodied in software, can be downloaded to reside on and be operated from different platforms used by a variety of operating systems.

Some embodiments relate to an apparatus for performing the operations described herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), and/or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the techniques set forth herein are not described with reference to any particular programming language. It will be appreciated that a variety of programming languages may be used to implement the techniques described herein, and any references above to specific languages are provided for illustrative purposes only.

Accordingly, in various embodiments, the techniques described herein can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the techniques described herein include: a mobile phone, personal digital assistant, smartphone, kiosk, server computer, enterprise computing device, desktop computer, laptop computer, tablet computer, consumer electronic device, television, set-top box, or the like. An electronic device for implementing the techniques described herein may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

In various embodiments, the techniques described herein can be implemented in a distributed processing environment, networked computing environment, or web-based computing environment. Elements can be implemented on client computing devices, servers, routers, and/or other network or non-network components. In some embodiments, the techniques described herein are implemented using a client/server architecture, wherein some components are implemented on one or more client computing devices and other components are implemented on one or more servers. In one embodiment, in the course of implementing the techniques of the present disclosure, client(s) request content from server(s), and server(s) return content in response to the requests. A browser may be installed at the client computing device for enabling such requests and responses, and for providing a user interface by which the user can initiate and control such interactions and view the presented content.

Any or all of the network components for implementing the described technology may, in some embodiments, be communicatively coupled with one another using any suitable electronic network, whether wired or wireless or any combination thereof, and using any suitable protocols for enabling such communication. One example of such a network is the Internet, although the techniques described herein can be implemented using other networks as well.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A method for delivering video for a virtual reality or augmented reality experience, the method comprising:
   at a data store, storing video data for a virtual reality or augmented reality experience, the video data comprising a first portion having a first importance metric and a second portion having a second importance metric, the first importance metric and the second importance metric being based on viewing data, the viewing data being one of:

historical viewings of the virtual reality or augmented reality experience indicating a set of portions of the virtual reality or augmented reality experience having been viewed by more viewers than other portions of the virtual reality or augmented reality experience, or a user input being indicative of a plurality of portions corresponding to a set of stimuli presented as a part of the virtual reality or augmented reality experience;

at a processor, receiving viewpoint data indicative of a position and/or an orientation of a viewer's viewpoint;

at the processor, retrieving a subset of the video data from the data store, the subset comprising at least the first portion of the video data;

at the processor, using the subset to generate viewpoint video of the virtual reality or augmented reality experience, from a virtual viewpoint corresponding to the viewer's viewpoint; and on a display device, displaying the viewpoint video;

wherein a difference exists between the first importance metric and the second importance metric, the difference denoting that viewing of the first portion is more likely and/or preferential to viewing of the second portion;

and wherein performing one step selected from the group consisting of storing the video data, retrieving the subset, and using the subset to generate the view-point video comprises, based on the difference, expediting and/or enhancing performance of the step for the first portion, relative to the second portion.

2. The method of claim 1, wherein:
the video data comprises a plurality of vantage video data sets, each of which represents a view from one of a plurality of vantages within a viewing volume;
the virtual viewpoint is within the viewing volume;
the viewpoint data is indicative of the position of the viewer's viewpoint; and
using the subset to generate the viewpoint video comprises using one or more of the vantage video data sets for one or more of the vantages positioned proximate the virtual viewpoint.

3. The method of claim 2, wherein:
the first portion comprises a first vantage video data set of the vantage video data sets, the first vantage video data set representing a view from a first vantage of the plurality of vantages;
the second portion comprises a second vantage video data set of the vantage video data sets, the second vantage video data set representing a view from a second vantage of the plurality of vantages; and
the first importance metric denotes that the first vantage video data set is more likely to be included in the subset than the second vantage video data set.

4. The method of claim 2, wherein:
the first portion represents one or more views from within a first region of the viewing volume;
the second portion represents one or more views from within a second region of the viewing volume; and
expediting and/or enhancing performance of the step for the first portion, relative to the second portion, comprises storing the video data such that at least one of a number of vantages, a density of vantages, locations of vantages, a number of vantages used to generate the viewpoint video, lighting applied to vantages, and resolution of vantages is enhanced within the first region, relative to the second region.

5. The method of claim 2, wherein:
each of the vantage video data sets comprises a plurality of tiles, each representing a view from a corresponding vantage of the plurality of vantages, along a viewing direction;
the viewpoint data is further indicative of the orientation* of the viewer's viewpoint;
and using the subset to generate the viewpoint video comprises using one or more of the tiles, with one or more viewing directions corresponding to the orientation, for each of the one or more of the vantages positioned proximate the virtual viewpoint.

6. The method of claim 5, wherein:
the first portion comprises a first tile of the plurality of tiles of a first vantage video data set of the vantage video data sets, the first tile representing a view from a first vantage of the plurality of vantages, along a first viewing direction;
the second portion comprises a second tile of the plurality of tiles of the first vantage video data set, the second tile representing a view from the first vantage, along a second viewing direction different from the first viewing direction; and
the first importance metric denotes that the first tile is more likely to be included in the subset than the second tile.

7. The method of claim 5, wherein:
the first portion represents a first set of tiles of the plurality of vantages, that are oriented along a first set of viewing directions of the one or more viewing directions;
the second portion represents a second set of tiles of the plurality of vantages, that are oriented along a second set of viewing directions of the one or more viewing directions; and
expediting and/or enhancing performance of the step for the first portion, relative to the second portion, comprises storing the video data such that at least one of a tile spatial resolution, tile temporal resolution, tile color depth, and tile bit rate is enhanced for the first set of tiles, relative to the second set of tiles.

8. The method of claim 1, wherein:
the subset comprises the first portion and the second portion of the video data; and
expediting and/or enhancing performance of the step for the first portion, relative to the second portion, comprises retrieving the subset of the video data such that the first portion is retrieved prior to retrieval of the second portion.

9. The method of claim 1, wherein:
the subset comprises the first portion and the second portion of the video data; and
expediting and/or enhancing performance of the step for the first portion, relative to the second portion, comprises using the subset to generate the viewpoint video such that a first segment of the viewpoint video incorporating the first portion of the video data is generated prior to generation of a second segment of the viewpoint video incorporating the second portion of the video data.

10. The method of claim 1, wherein:
the subset comprises the first portion and the second portion of the video data; and
expediting and/or enhancing performance of the step for the first portion, relative to the second portion, comprises using the subset to generate the viewpoint video such that a first segment of the viewpoint video incorporating the first portion of the video data has a higher level of quality than a second segment of the viewpoint video incorporating the second portion of the video data.

11. The method of claim 1, further comprising:
at the data store, receiving viewing data indicating that one or more viewers prefer or more frequently view the first portion of the video data over the second portion of the video data;
at the processor, based on the viewing data, assigning the first importance metric to the first portion of the video data; and
at the processor, based on the viewing data, assigning the second importance metric to the second portion of the video data.

12. The method of claim 1, further comprising:
at an input device, receiving user input indicating that viewing of the first portion is more likely and/or preferential to viewing of the second portion;
at the processor, based on the user input, assigning the first importance metric to the first portion of the video data; and
at the processor, based on the user input, assigning the second importance metric to the second portion of the video data.

13. The method of claim 12, wherein:
the user input indicates that viewing of the first portion is more likely than viewing of the second portion; and
the method further comprises, at an output device distinct from the display device, delivering an olfactory or tactile stimulus to the viewer to prompt the viewer to position or orient the viewer's viewpoint in a manner that causes the first portion of the video data to be included in the subset.

14. The method of claim 1, further comprising:
at the processor, carrying out analysis of one or both of the video data and audio data that accompanies the video data to determine that viewing of the first portion is more likely and/or preferential to viewing of the second portion;
at the processor, based on the analysis, assigning the first importance metric to the first portion of the video data; and
at the processor, based on the analysis, assigning the second importance metric to the second portion of the video data.

15. A non-transitory computer-readable medium for delivering video for a virtual reality or augmented reality experience, comprising instructions stored thereon, that when executed by a processor, perform the steps of:
causing a data store to store video data for a virtual reality or augmented reality experience, the video data comprising a first portion having a first importance metric and a second portion having a second importance metric, the first importance metric and the second importance metric being based on viewing data, the viewing data being one of:
historical viewings of the virtual reality or augmented reality experience indicating a set of portions of the virtual reality or augmented reality experience having been viewed by more viewers than other portions of the virtual reality or augmented reality experience, or
a user input being indicative of a plurality of portions corresponding to a set of stimuli presented as a part of the virtual reality or augmented reality experience receiving viewpoint data indicative of a position and/or an orientation of a viewer's viewpoint;
retrieving a subset of the video data from the data store, the subset comprising at least the first portion of the video data;
using the subset to generate viewpoint video of the virtual reality or augmented reality experience, from a virtual viewpoint corresponding to the viewer's viewpoint; and
causing a display device to display the viewpoint video;
wherein a difference exists between the first importance metric and the second importance metric, the difference denoting that viewing of the first portion is more likely and/or preferential to viewing of the second portion;
and wherein performing one step selected from the group consisting of storing the video data, retrieving the subset, and using the subset to generate the view-point video comprises, based on the difference, expediting and/or enhancing performance of the step for the first portion, relative to the second portion.

16. The non-transitory computer-readable medium of claim 15, wherein:
the video data comprises a plurality of vantage video data sets, each of which represents a view from one of a plurality of vantages within a viewing volume;
the virtual viewpoint is within the viewing volume;
the viewpoint data is indicative of the position of the viewer's viewpoint; and
using the subset to generate the viewpoint video comprises using one or more of the vantage video data sets for one or more of the vantages positioned proximate the virtual viewpoint.

17. The non-transitory computer-readable medium of claim 16, wherein:
the first portion comprises a first vantage video data set of the vantage video data sets, the first vantage video data set representing a view from a first vantage of the plurality of vantages;
the second portion comprises a second vantage video data set of the vantage video data sets, the second vantage video data set representing a view from a second vantage of the plurality of vantages; and
the first importance metric denotes that the first vantage video data set is more likely to be included in the subset than the second vantage video data set.

18. The non-transitory computer-readable medium of claim 16, wherein:
the first portion represents one or more views from within a first region of the viewing volume;
the second portion represents one or more views from within a second region of the viewing volume; and
expediting and/or enhancing performance of the step for the first portion, relative to the second portion, comprises storing the video data such that at least one of a number of vantages, a density of vantages, locations of vantages, a number of vantages used to generate the viewpoint video, lighting applied to vantages, and resolution of vantages is enhanced within the first region, relative to the second region.

19. The non-transitory computer-readable medium of claim 16, wherein:
each of the vantage video data sets comprises a plurality of tiles, each representing a view from a corresponding vantage of the plurality of vantages, along a viewing direction;
the viewpoint data is further indicative of the orientation of the viewer's viewpoint; and using the subset to generate the viewpoint video comprises using one or more of the tiles, with one or more viewing directions corresponding to the orientation, for each of the one or more of the vantages positioned proximate the virtual viewpoint.

20. The non-transitory computer-readable medium of claim 19, wherein:
the first portion comprises a first tile of the plurality of tiles of a first vantage video data set of the vantage vide data sets, the first tile representing a view from a first vantage of the plurality of vantages, along a first viewing direction;
the second portion comprises a second tile of the plurality of tiles of the first vantage video data set, the second tile representing a view from the first vantage, along a second viewing direction different from the first viewing direction; and
the first importance metric denotes that the first tile is more likely to be included in the subset than the second tile.

21. The non-transitory computer-readable medium of claim 19, wherein:
the first portion represents a first set of tiles of the plurality of vantages, that are oriented along a first set of viewing directions of the one or more viewing directions;
the second portion represents a second set of tiles of the plurality of vantages, that are oriented along a second set of viewing directions of the one or more viewing directions; and
expediting and/or enhancing performance of the step for the first portion, relative to the second portion, comprises storing the video data such that at least one of a tile spatial resolution, tile temporal resolution, tile color depth, and tile bit rate is enhanced for the first set of tiles, relative to the second set of tiles.

22. The non-transitory computer-readable medium of claim 15, wherein:
the subset comprises the first portion and the second portion of the video data; and
expediting and/or enhancing performance of the step for the first portion, relative to the second portion, comprises performing at least one selection from the group consisting of:
retrieving the subset of the video data such that the first portion is retrieved prior to retrieval of the second portion;
using the subset to generate the viewpoint video such that a first segment of the viewpoint video incorporating the first portion of the video data is generated prior to generation of a second segment of the viewpoint video incorporating the second portion of the video data; and
using the subset to generate the viewpoint video such that a first segment of the viewpoint video incorporating the first portion of the video data has a higher level of quality than a second segment of the viewpoint video incorporating the second portion of the video data.

23. The non-transitory computer-readable medium of claim 15, further comprising instructions stored thereon, that when executed by a processor, perform the steps of:
causing the data store to receive viewing data indicating that one or more viewers prefer or more frequently view the first portion of the video data over the second portion of the video data;
based on the viewing data, assigning the first importance metric to the first portion of the video data; and
based on the viewing data, assigning the second importance metric to the second portion of the video data.

24. The non-transitory computer-readable medium of claim 15, further comprising instructions stored thereon, that when executed by a processor, perform the steps of:
causing an input device to receive user input indicating that viewing of the first portion is more likely and/or preferential to viewing of the second portion;
based on the user input, assigning the first importance metric to the first portion of the video data; and
processor, based on the user input, assigning the second importance metric to the second portion of the video data.

25. The non-transitory computer-readable medium of claim 15, further comprising instructions stored thereon, that when executed by a processor, perform the steps of:
carrying out analysis of one or both of the video data and audio data that accompanies the video data to determine that viewing of the first portion is more likely and/or preferential to viewing of the second portion;
based on the analysis, assigning the first importance metric to the first portion of the video data; and
based on the analysis, assigning the second importance metric to the second portion of the video data.

26. A system for delivering video for a virtual reality or augmented reality experience, the system comprising:
a data store configured to store video data for a virtual reality or augmented reality experience, the video data comprising a first portion having a first importance metric and a second portion having a second importance metric, the first importance metric and the second importance metric being based on viewing data, the viewing data being one of:
historical viewings of the virtual reality or augmented reality experience indicating a set of portions of the virtual reality or augmented reality experience having been viewed by more viewers than other portions of the virtual reality or augmented reality experience, or
a user input being indicative of a plurality of portions corresponding to a set of stimuli presented as a part of the virtual reality or augmented reality experience
a processor, communicatively connected to the data store, configured to:
receive viewpoint data indicative of a position and/or an orientation of a viewer's viewpoint;
retrieve a subset of the video data from the data store, the subset comprising at least the first portion of the video data; and
use the subset to generate viewpoint video of the virtual reality or augmented reality experience, from a virtual viewpoint corresponding to the viewer's viewpoint; and
a display device, communicatively coupled to the processor, configured to display the viewpoint video;
wherein a difference exists between the first importance metric and the second importance metric, the difference denoting that viewing of the first portion is more likely and/or preferential to viewing of the second portion;
and wherein the data store and/or the processor are further configured to perform one step selected from the group consisting of storing the video data, retrieving the subset, and using the subset to generate the viewpoint video by, based on the difference, expediting and/or enhancing performance of the step for the first portion, relative to the second portion.

27. The system of claim 26, wherein:
the video data comprises a plurality of vantage video data sets, each of which represents a view from one of a plurality of vantages within a viewing volume;
the virtual viewpoint is within the viewing volume;
the viewpoint data is indicative of the position of the viewer's viewpoint; and
the processor is further configured to use the subset to generate the viewpoint video by using one or more of the vantage video data sets for one or more of the vantages positioned proximate the virtual viewpoint.

28. The system of claim 27, wherein:
the first portion comprises a first vantage video data set of the vantage video data sets, the first vantage video data set representing a view from a first vantage of the plurality of vantages;
the second portion comprises a second vantage video data set of the vantage video data sets, the second vantage video data set representing a view from a second vantage of the plurality of vantages; and
the first importance metric denotes that the first vantage video data set is more likely to be included in the subset than the second vantage video data set.

29. The system of claim 27, wherein:
the first portion represents one or more views from within a first region of the viewing volume;
the second portion represents one or more views from within a second region of the viewing volume; and
the processor and/or the data store are further configured to expedite and/or enhance performance of the step for the first portion, relative to the second portion, by storing the video data such that at least one of a number of vantages, a density of vantages, locations of vantages, a number of vantages used to generate the viewpoint video, lighting applied to vantages, and resolution of vantages is enhanced within the first region, relative to the second region.

30. The system of claim 27, wherein:
each of the vantage video data sets comprises a plurality of tiles, each representing a view from a corresponding vantage of the plurality of vantages, along a viewing direction;
the viewpoint data is further indicative of the orientation of the viewer's viewpoint; and
the processor is further configured to use the subset to generate the viewpoint video by using one or more of the tiles, with one or more viewing directions corresponding to the orientation, for each of the one or more of the vantages positioned proximate the virtual viewpoint.

31. The system of claim 30, wherein:
the first portion comprises a first tile of the plurality of tiles of a first vantage video data set of the vantage vide data sets, the first tile representing a view from a first vantage of the plurality of vantages, along a first viewing direction;
the second portion comprises a second tile of the plurality of tiles of the first vantage video data set, the second tile representing a view from the first vantage, along a second viewing direction different from the first viewing direction; and
the first importance metric denotes that the first tile is more likely to be included in the subset than the second tile.

32. The system of claim 30, wherein:
the first portion represents a first set of tiles of the plurality of vantages, that are oriented along a first set of viewing directions of the one or more viewing directions;
the second portion represents a second set of tiles of the plurality of vantages, that are oriented along a second set of viewing directions of the one or more viewing directions; and
the processor and/or the data store are further configured to expedite and/or enhance performance of the step for the first portion, relative to the second portion, by storing the video data such that at least one of a tile spatial resolution, tile temporal resolution, tile color depth, and tile bit rate is enhanced for the first set of tiles, relative to the second set of tiles.

33. The system of claim 26, wherein:
the subset comprises the first portion and the second portion of the video data; and
the processor and/or the data store are further configured to expedite and/or enhance performance of the step for the first portion, relative to the second portion, by performing at least one of:
retrieving the subset of the video data such that the first portion is retrieved prior to retrieval of the second portion;
using the subset to generate the viewpoint video such that a first segment of the viewpoint video incorporating the first portion of the video data is generated prior to generation of a second segment of the viewpoint video incorporating the second portion of the video data; and
using the subset to generate the viewpoint video such that a first segment of the viewpoint video incorporating the first portion of the video data has a higher level of quality than a second segment of the viewpoint video incorporating the second portion of the video data.

34. The system of claim 26, wherein:
the data store is further configured to receive viewing data indicating that one or more viewers prefer or more frequently view the first portion of the video data over the second portion of the video data; and
the processor is further configured, based on the viewing data, to:
assign the first importance metric to the first portion of the video data; and
assign the second importance metric to the second portion of the video data.

35. The system of claim 26, further comprising an input device configured to receive user input indicating that viewing of the first portion is more likely and/or preferential to viewing of the second portion;
wherein the processor is further configured to, based on the user input:
assign the first importance metric to the first portion of the video data; and
assign the second importance metric to the second portion of the video data.

36. The system of claim 26, wherein the processor is further configured to:
carry out analysis of one or both of the video data and audio data that accompanies the video data to determine that viewing of the first portion is more likely and/or preferential to viewing of the second portion;
based on the analysis, assign the first importance metric to the first portion of the video data; and based on the analysis, assign the second importance metric to the second portion of the video data.

\* \* \* \* \*

UNITED STATES PATENT AND TRADEMARK OFFICE
CERTIFICATE OF CORRECTION

PATENT NO. : 10,440,407 B2
APPLICATION NO. : 15/590808
DATED : October 8, 2019
INVENTOR(S) : Alex Song et al.

It is certified that error appears in the above-identified patent and that said Letters Patent is hereby corrected as shown below:

In the Claims

At Column 17 Line 31, please correct "view-point" to be --viewpoint--

At Column 18 Line 08, please correct "orientation*" to be --orientation--

At Column 18 Line 17, please correct "vide" to be --video--

At Column 20 Line 17, please correct "view-point" to be --viewpoint--

At Column 21 Line 09, please correct "vide" to be --video--

At Column 22 Line 12, please insert --the-- before --processor--

Signed and Sealed this
Twenty-fourth Day of October, 2023

Katherine Kelly Vidal
*Director of the United States Patent and Trademark Office*